US010398986B1

(12) United States Patent
Henroid

(10) Patent No.: US 10,398,986 B1
(45) Date of Patent: Sep. 3, 2019

(54) SYSTEM FOR MULTIPLAYER GAME SEARCHING AND MATCHING AND METHODS THEREFOR

(71) Applicant: Colton Henroid, Dunedin, FL (US)

(72) Inventor: Colton Henroid, Dunedin, FL (US)

(*) Notice: Subject to any disclaimer, the term of this patent is extended or adjusted under 35 U.S.C. 154(b) by 0 days.

(21) Appl. No.: 15/385,151

(22) Filed: Dec. 20, 2016

Related U.S. Application Data

(60) Provisional application No. 62/270,814, filed on Dec. 22, 2015.

(51) Int. Cl.
*G06F 15/16* (2006.01)
*A63F 13/795* (2014.01)
*A63F 13/35* (2014.01)
*A63F 13/335* (2014.01)
*A63F 13/32* (2014.01)
*A63F 13/822* (2014.01)

(52) U.S. Cl.
CPC ............ *A63F 13/795* (2014.09); *A63F 13/32* (2014.09); *A63F 13/335* (2014.09); *A63F 13/35* (2014.09); *A63F 13/822* (2014.09); *A63F 2300/8076* (2013.01)

(58) Field of Classification Search
CPC .................. A63F 13/795; A63F 13/798; A63F 2300/556; A63F 2300/558; A63F 2300/5566
See application file for complete search history.

(56) References Cited

U.S. PATENT DOCUMENTS

| 6,352,479 | B1* | 3/2002 | Sparks, II | A63F 13/12 463/29 |
| 7,677,970 | B2 | 3/2010 | O'Kelley, II et al. | |
| 8,196,191 | B2 | 6/2012 | Norman et al. | |
| 8,651,961 | B2* | 2/2014 | Muller | A63F 13/12 463/42 |
| 2004/0127289 | A1* | 7/2004 | Davis | A63F 13/12 463/42 |
| 2005/0192097 | A1* | 9/2005 | Farnham | A63F 13/12 463/42 |
| 2006/0063590 | A1* | 3/2006 | Abassi | A63F 13/12 463/29 |
| 2006/0080702 | A1* | 4/2006 | Diez | A63F 13/12 725/30 |

(Continued)

FOREIGN PATENT DOCUMENTS

| WO | WO2007044908 | 4/2007 |
| WO | WO2014014840 | 1/2014 |
| WO | WO2015041697 | 3/2015 |

*Primary Examiner* — Lawrence S Galka
(74) *Attorney, Agent, or Firm* — Goldstein Law Offices, P.C.

(57) ABSTRACT

Described are embodiments of systems and methods for a platform configured to allow players to search for a match across multiple game titles simultaneously as well as by a map(s) and/or mode(s) based filter(s). In embodiments, a matchmaking interface allows the player to find a map and mode that best suits the player's style of play, as well as cut down on wait time by providing both multiplayer and single player search results that meet preset user criteria. In certain embodiments, the system is configured to generate a gaming experience for a player on a game client by substituting AI player objects for real players.

14 Claims, 19 Drawing Sheets

(56) References Cited

U.S. PATENT DOCUMENTS

| | | | | |
|---|---|---|---|---|
| 2006/0121990 A1* | 6/2006 | O'Kelley, II | ......... | A63F 13/795 463/42 |
| 2009/0075736 A1* | 3/2009 | Kniberg | ................. | A63F 13/49 463/42 |
| 2009/0124387 A1* | 5/2009 | Perlman | ................. | A63F 13/12 463/42 |
| 2011/0306426 A1* | 12/2011 | Novak | ................... | G06Q 30/02 463/42 |
| 2012/0302351 A1* | 11/2012 | Murphy | ................. | A63F 13/12 463/42 |
| 2012/0309539 A1* | 12/2012 | Smith | ................... | A63F 13/795 463/42 |
| 2013/0065692 A1 | 3/2013 | Aronzon et al. | | |
| 2014/0025732 A1 | 1/2014 | Lin et al. | | |
| 2014/0309037 A1* | 10/2014 | Premutico | ............. | A63F 13/332 463/42 |
| 2015/0057084 A1* | 2/2015 | Lin | ...................... | A63F 13/795 463/42 |

\* cited by examiner

SYSTEM FOR MULTIPLAYER GAME SEARCHING AND MATCHING AND METHODS THEREFOR

CROSS REFERENCES AND RELATED SUBJECT MATTER

This application is a non-provisional filing of provisional patent application Ser. No. 62/270,814, filed in the United States Patent Office on Dec. 22, 2015, which is incorporated by reference herein in its entirety.

FIELD OF THE INVENTION

The present invention relates to video gaming systems.

BACKGROUND

Game types can include single-player, multiplayer games that have a few players to hundreds of players, such as real-time strategy games ("RTS" with 8 players or less) and first person shooters ("FPS" with up to 256 players) or massively multiplayer online games ("MMO"), which can include up to thousands of players. Examples of MMOs include massively multiplayer online role-playing game ("MMORPG"), massively multiplayer online real-time strategy game ("MMORTS"), massively multiplayer online first person shooter ("MMOFPS"), multiplayer online battle arena ("MOBA") and massively multiplayer online sandbox ("MMOS").

Conventionally, two common formats are employed to match and join clients in a multiplayer game. One format allows a player/user to choose a match from a list. When the player selects a match from the list, if space is available on the game server for the selected match, the client will be connected into the selected game server. The other format uses automatic matchmaking technology. After a player chooses the game objective type they wish to play, the client gaming device is connected into the next available match on the game server. Other filters can be employed in combination with these formats, such as experience level or desired play style (aggressive, or passive).

SUMMARY

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to a network-based game management system, comprising a processor coupled to a network, memory coupled to the processor, and various modules coupled to the processor and/or the memory to provide desired functionality. The network includes a plurality of game servers and a plurality of client devices including a user's client device.

In an implementation, a game usage controller is coupled to the processor and adapted to determine a user's rights of access to a plurality of games located at the plurality of game servers and at the user's client device. The plurality of games includes multiple unrelated game titles produced by multiple unrelated game producers.

A game matching engine is stored in the memory and operable on the processor to find a desired gaming experience within the plurality of games, including single-player, multiplayer, and massively multiplayer online (MMO) game sessions, based on game metrics and user-selected parameters and conditionals. The game matching engine is also operable to provide user access to the desired gaming experience.

In an embodiment, a multiplayer gameplay supporter is coupled to the processor and adapted to search for available players and game times related to the desired gaming experience. A game download module is coupled to the processor and adapted to locally store game code relative to the desired gaming experience or to point to the location of the code.

A network communication component is coupled to the processor and adapted to return a prioritized list of potential gaming experiences at a user interface, based on the user-selected parameters and conditionals. An automatic placement engine is coupled to the processor and adapted to automatically place the user's client device in a gaming experience that meets the user-selected parameters and conditionals.

In an embodiment, the game management system comprises an offline game generator adapted to generate an offline game experience that simulates an online game experience when a suitable online game experience is unavailable, non-existent, or delayed. In another embodiment, the game management system further comprises a client game generator configured to locally replace player objects from an online multiplayer game on a game server with downloaded game elements or artificial intelligence (AI) controlled objects when a connection with the game server is lost.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF EMBODIMENTS

Overview

Figure 1A:
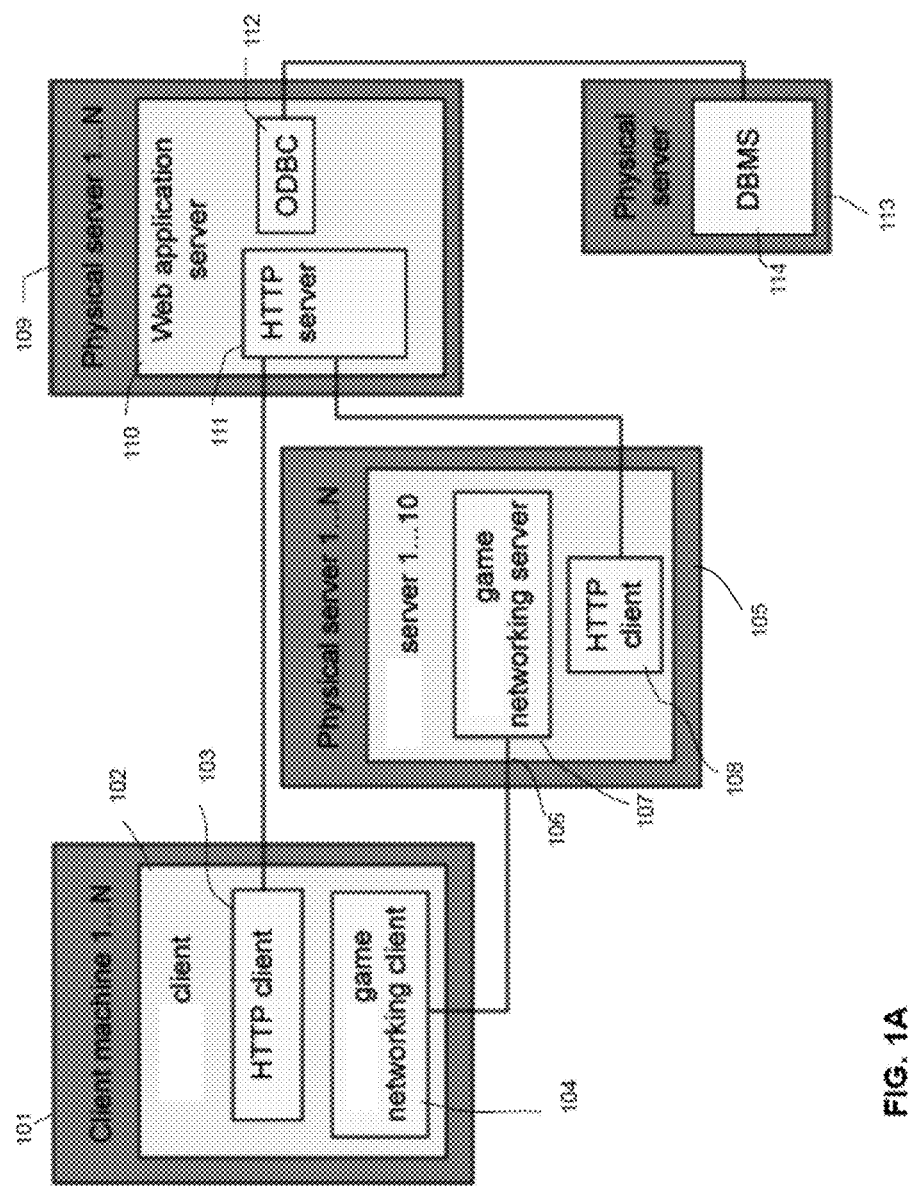
FIGS. 1A-1B show an architecture for a multiplayer gaming platform.

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

The use of the terms "a," "an," "at least one," "one or more," and similar terms indicate one of a feature or element as well as more than one of a feature. The use of the term "the" to refer to the feature does not imply only one of the feature and element.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate). Similarly, where more than one device, article or other product is described herein (whether or not they cooperate), a single device/article may alternatively be used in place of the more than one device or article that is described. Accordingly, the various functionality that is described as being possessed by more than one device or article may alternatively be possessed by a single device/article.

The functionality and/or the features of a single device that is described may be alternatively embodied by one or more other devices, which are described but are not explicitly described as having such functionality/features. Thus, other embodiments need not include the described device itself, but rather can include the one or more other devices, which would, in those other embodiments, have such functionality/features.

These and other embodiments are disclosed or are apparent from, and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the detailed description describes various embodiments for illustration purposes and embodiments include the methods described and may be implemented using one or more apparatus, such as processing apparatus coupled to electronic media. Embodiments of the present invention may be stored on an electronic media (electronic memory, RAM, ROM, EEPROM) or programmed as computer code (e.g., source code, object code or any suitable programming language) to be executed by one or more processors operating in conjunction with one or more electronic storage media.

Embodiments may be implemented using one or more processing devices, or processing modules. The processing devices, or modules, may be coupled such that portions of the processing and/or data manipulation may be performed at one or more processing devices and shared or transmitted between a plurality of processing devices.

Described are embodiments of systems and methods for a platform configured to allow players to search for a match across multiple game titles simultaneously, as well as by map(s) and/or mode(s) based filter(s). In certain embodiments, a matchmaking interface allows the player to, among other advantages and options, find a map and mode that best suits the player's style of play as well as cut down on wait time.

Maps define the virtual environment of game play, including limitations or restrictions of the game "universe." Modes include configurations that change the way a game is played, such as single player, multiplayer, or MMO, cooperative or competitive play, and the like. Modes can also include restrictions, behaviors, rules, game mechanics, or game goals (e.g., campaigns, storylines, character development, "death-matches," capture-the-flag, etc.).

In at least one of the various embodiments, the system is configured to take a list of games that the player user owns or has access to, and the system is configured to search those games for an online match based on the map(s), and/or mode(s) based filter(s). In at least one of the various embodiments, the system is configured to show the user findings in whichever format is preferred, for example, by list or by automatic placement in a match that meets the search criteria.

Game System Architecture

Multiplayer-capable gaming engines provide gaming client and server networking, although each gaming engine implements the actual gaming client-and-server networking in its own manner. FIGS. 1-2D show components of embodiments of an environment in which embodiments of the innovations described herein may be practiced. Not all of the components may be required to practice the innovations, and variations in the arrangement and type of the components may be made without departing from the spirit or scope of the innovations.

FIG. 1A shows an example of a high level MMO game architecture for a gaming engine. All multiplayer-capable gaming engines provide gaming client-and-server networking, although each gaming engine implements the actual gaming client-and-server networking in its own manner. A gaming architecture generally comprises a gaming client to render the game for the user, game servers to interact with the gaming client, a web application server or connection server to integrate with the gaming servers and clients, and a database server to persist and retrieve data. Game server architectures are numerous and can vary based on a number of factors, such as type of game, scalability, client system, resource constraints, number of players, game world complexity, etc. Game performance is dependent on a number of factors, such as the processing power and bandwidth available to a server, the design of the world, and the game type. For example, for the design of the world, a game consisting of simple avatars walking around a featureless plane devoid of any objects and in a thick fog can perform better than a highly interactive first-person shooter set in a richly detailed world full of numerous objects. As to game type, a virtual world or turn-based MMORPG does not require the networking fidelity and performance of a first-person shooter game. Some MMO engines, including some that spawn from single-player games, act more like match servers for players than immersive online worlds. These engines do not have a persistent world in which players can move and interact with one another, but instead allow players to find each other, after which they use their own software to start and play a game. Non-limiting examples of game server architectures include monolithic architecture, sharded architecture, distributed network connections, and client-side load balancing.

Game Client

Referring to FIG. 1A, the client computer 1 . . . N 101 represents user(s)' machines running a game (or gaming) client 102. Client computers 1 . . . N indicates that there can be more than one concurrent machine (user). The client 102 includes an HTTP client 103 with which the client machine can send GET requests to a connection server 109, such as a web server including a web application server 110, and process the returning page sent by the web server 110. The client computer 101 also includes a game networking client 104 comprising components that allows the game client 102 to talk to a game networking server 107 on a physical server 105.

Game Server

Physical Server 1 . . . N 105 can comprise multiple game servers 106 that can be run on a single physical server 105. Multiple game servers 106 can also be run on a particular processor within a single server 105. For example, in an embodiment a game server 106 may default to ten instances of a game server 106 per processor. Physical server 1 . . . N 105 is the actual physical server 105 that runs the game servers 106; again a single physical server 105 or multiple physical servers 105 can run the game servers 106. For example, the architecture can be a sharded architecture, where scalability is provided by distributing servers onto multiple physical servers.

A game networking server 107 comprises code that allows the game servers 106 to talk to the game clients 102. The game server 106 also comprises an HTTP client 108 configured to send GET requests to an HTTP server 111 and can also make HTTP requests.

Connection Sever/Web Application Server

Physical connection server 1 . . . N 109 is a physical server that runs a web application server 110. The web application server 110 compromises an HTTP server 111 that processes the HTTP requests from the game client 102 and game server 106. A database connection 112 includes an application programming interface (API) that connects the web application server 110 to the database 113, such as Open Database Connectivity (ODBC) or Java™ Database Connectivity (JDBC).

Database Management System

A database management system comprises a physical server 113 including a database server 114 to persist game data for the game engine.

The exemplary architecture comprises a three-tiered server architecture, wherein the client, the Web business-logic server, and database components are modularized. Game servers can also be considered clients of the Web server. The gaming client and game server can comprise standard MOG for multiplayer gaming engines. The Web application server and database management server provide the functions to implement an MMO game, or a persistent, integrated gaming world. The Web server serves up web services that can retrieve and persist data.

Figure 1B:
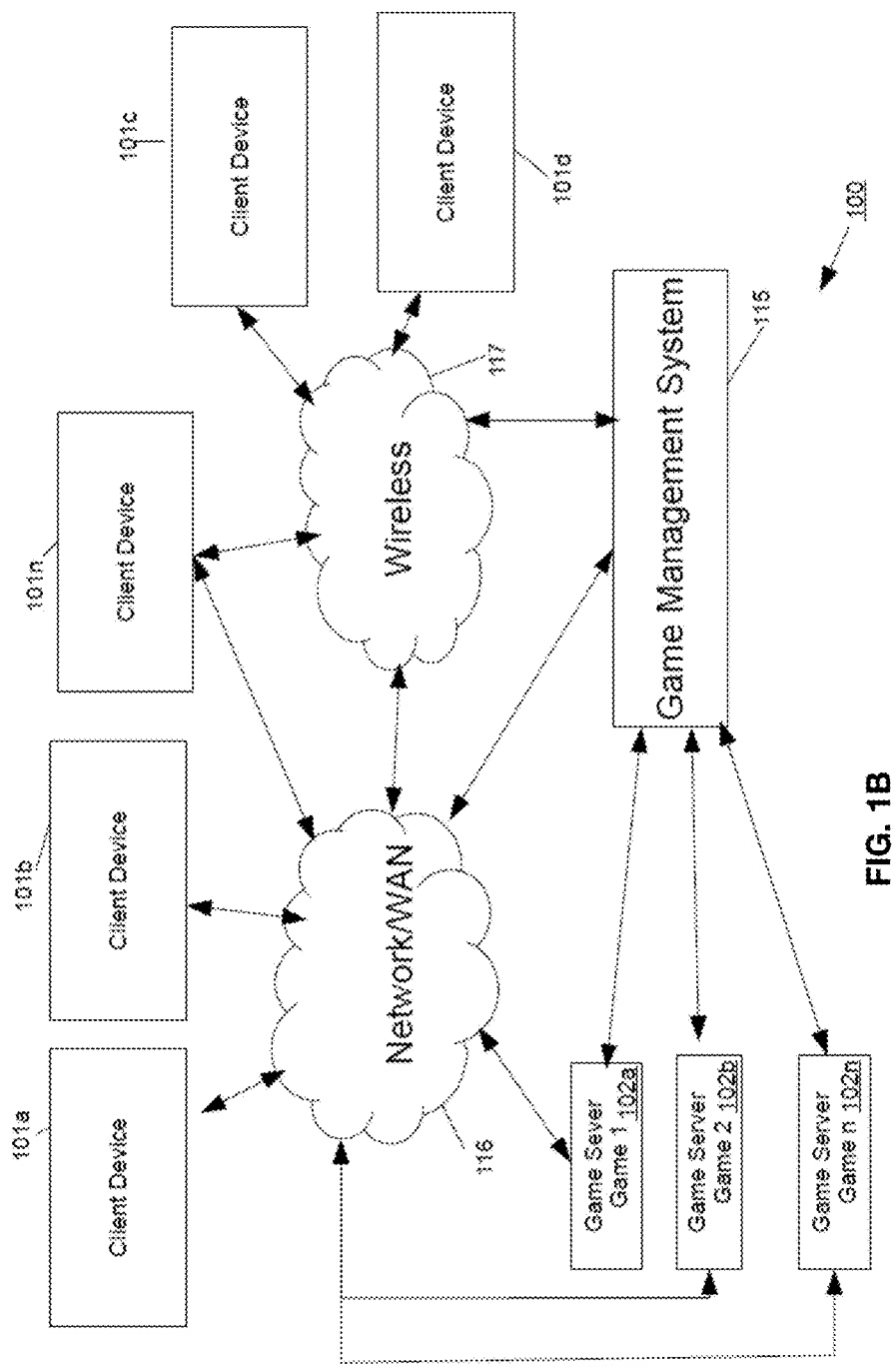

FIG. 1B is a block diagram of one embodiment of a system 100, in which embodiments described herein may operate. The system 100 includes a wide area network (e.g., the Internet) 116, a wireless network 117, client devices 101a . . . 101n, a game management system 115, and game severs for Game 1 102a, Game 2 102b, and Game n 102n. As described herein, each game server for Game 1 102a, Game 2 102b, and Game n 102n can be a single server or multiple servers running a given multiplayer game as described herein. For simplicity, connection servers are not separately shown.

Computers that may operate as client computers 101a . . . 101n may include computers, configured to include a gaming client, that typically connect using a wired or wireless communications medium such as personal computers, multiprocessor systems, microprocessor-based or programmable electronic devices, network PCs, or the like. In some embodiments, client computers 101a . . . 101n may include virtually any portable personal computer capable of running a gaming program and connecting to another computing device and receiving information such as a mobile gaming device, a laptop computer, a smart mobile telephone, tablet computers, and the like. Other portable devices such as cellular telephones, display pagers, radio frequency (RF) devices, infrared (IR) devices, Personal Digital Assistants (PDAs), handheld computers, wearable computers, integrated devices combining one or more of the preceding devices, and the like may serve as the portable computer described herein. As such, client computers 101a . . . 101n may have a wide range of capabilities and features. Moreover, client computers 101a . . . 101n may be configured to access various computing applications, including a browser, or other web-based application.

In at least one of the various embodiments, the client computers 101a ... 101n can be mobile devices coupled to the game management system 102 via the wireless network 117. Mobile devices are interactive two-way communication devices that allow their users to play wireless games. For example, the mobile devices may be smart phones, palm-sized computing devices, personal digital assistants (PDAs), portable game devices, tablets, etc. Such two-way communication devices may communicate wirelessly with the game management system 102 via the wireless network 117. Wireless network 117 may further employ a plurality of access technologies including 2nd (2G), 3rd (3G), 4th (4G), and 5th (5G) generation radio access for cellular systems, WLAN, Wireless Router (WR) mesh, and the like. Access technologies such as 2G, 3G, 4G, 5G, and future access networks may enable wide area coverage for mobile devices. In one non-limiting example, wireless network 117 may enable a radio connection through a radio network access such as Global System for Mobile communication (GSM), General Packet Radio Services (GPRS), Enhanced Data GSM Environment (EDGE), Code Division Multiple Access (CDMA), Time Division Multiple Access (TDMA), Wideband Code Division Multiple Access (WCDMA), High Speed Downlink Packet Access (HSDPA), Long Term Evolution (LTE), and the like. In essence, wireless network 117 may include virtually any wireless communication mechanism by which information may travel between client computers 101a ... 101n and another computer, network, and the like.

The client computers 101a ... 101n can be coupled to the game management system 115 via the wide area network 116 (e.g., the Internet). The client computers 108 are interactive two-way communication devices that allow their users to play console games, web games or personal computer (PC) games. For example, the client computers 101a ... 101n may be PC systems, personal digital assistants (PDA)s, gaming consoles, consumer electronic devices, etc. Generally, client computers 101a ... 101n may include virtually any computer capable of running gaming programs, communicating over a network to send and receive information, and performing various online activities and offline actions. It should be recognized that more or less client computers may be included within a system such as described herein, and embodiments are therefore not constrained by the number or type of client computers employed.

Network 116 is configured to couple network computers with other computers and/or computing devices, including, game management system 115, client computer(s) 101a, 101b, 101n and client computers 101c, 101d, through wireless network 117. Network 116 is enabled to employ any form of computer readable media for communicating information from one electronic device to another. Also, network 116 can include the Internet in addition to Local Area Networks (LANs), Wide Area Networks (WANs), direct connections, such as through a Universal Serial Bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communication links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 116 may be configured to transport information of an Internet Protocol (IP). In essence, network 116 includes any communication method by which information may travel between computing devices.

Additionally, communication media typically embodies computer readable instructions, data structures, program modules, or other transport mechanism, and includes any information delivery media. By way of example, communication media includes wired media such as twisted pair, coaxial cable, fiber optics, wave guides, and other wired media and wireless media such as acoustic, RF, infrared, and other wireless media.

The game management system 115 provides services to deploy, manage and support games on the client computers 101a ... 101n, thus providing game services across different device platforms (e.g., PC platforms, wireless device platforms, web-based hand-held device platforms, game console platforms, etc.). The game management system 115 may be maintained by a game manufacturer, a game publisher, a network communication carrier, or any other provider of game services (any other entity controlling user access to electronic games). It will be understood that modules of the game management system 115 may be hosted and/or run on the other devices, for example, on connection servers, game servers, or client devices.

Figure 2A:
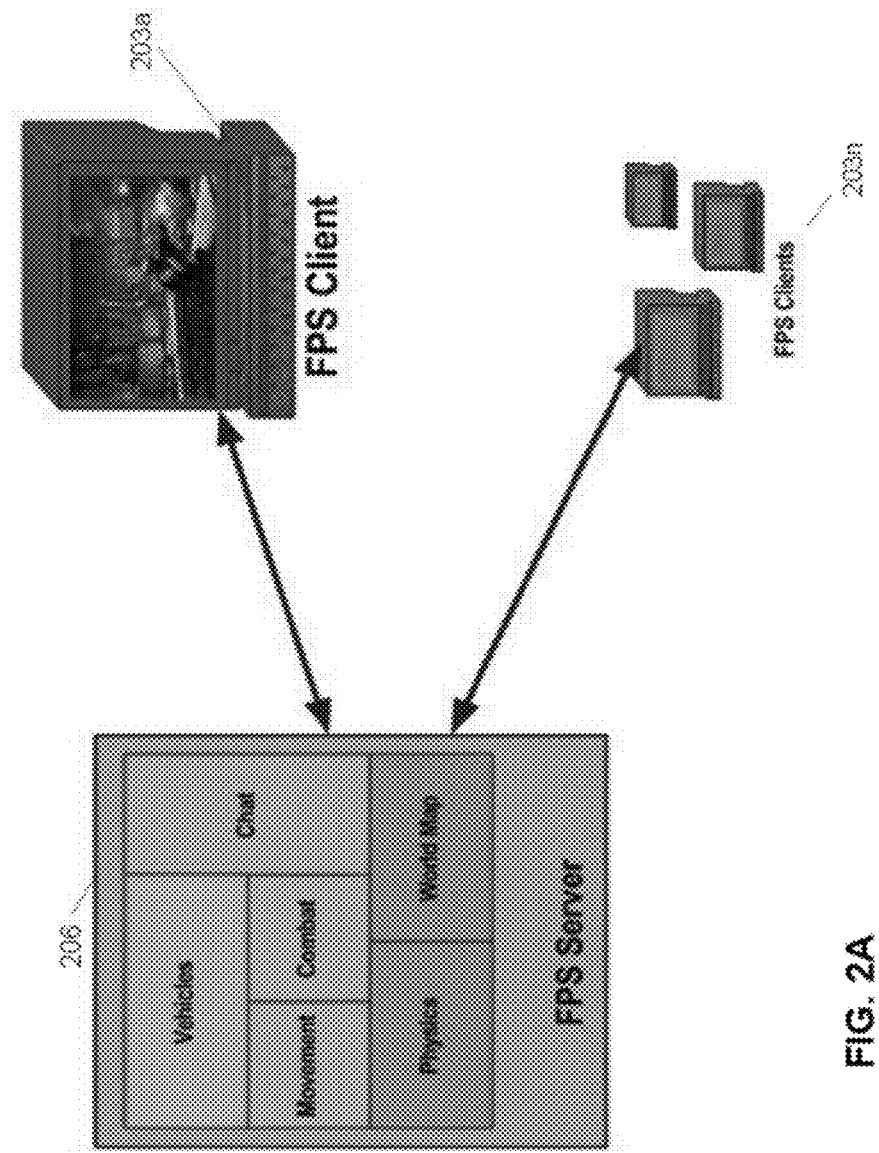
FIGS. 2A-2D show embodiments of architectures for a multiplayer gaming platform.
Figure 2B:
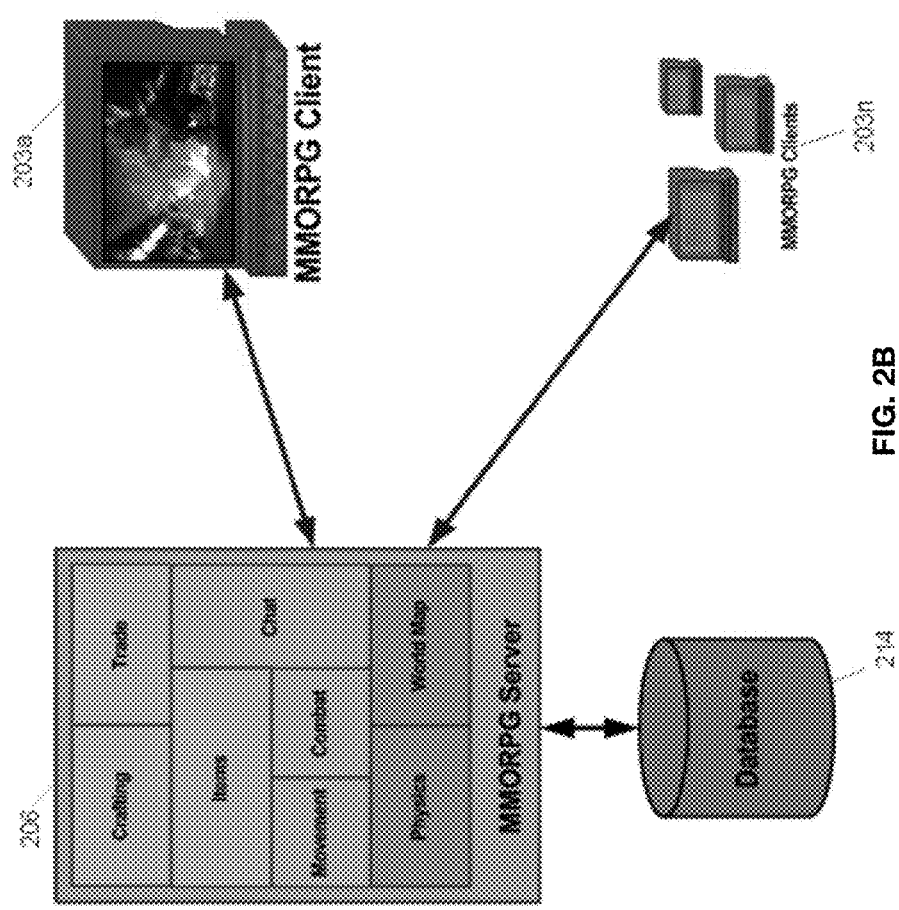

FIGS. 2A and 2B show examples of a monolithic architecture for a FPS game and a MMORPG respectively. In an embodiment, the game server 206 can implement the entire game in a single process on a single computer, which can handle a plurality of clients 203a ... 203n. Common database 214 technologies that run on the same or a separate computer can be employed to implement game persistence.

Figure 2C:
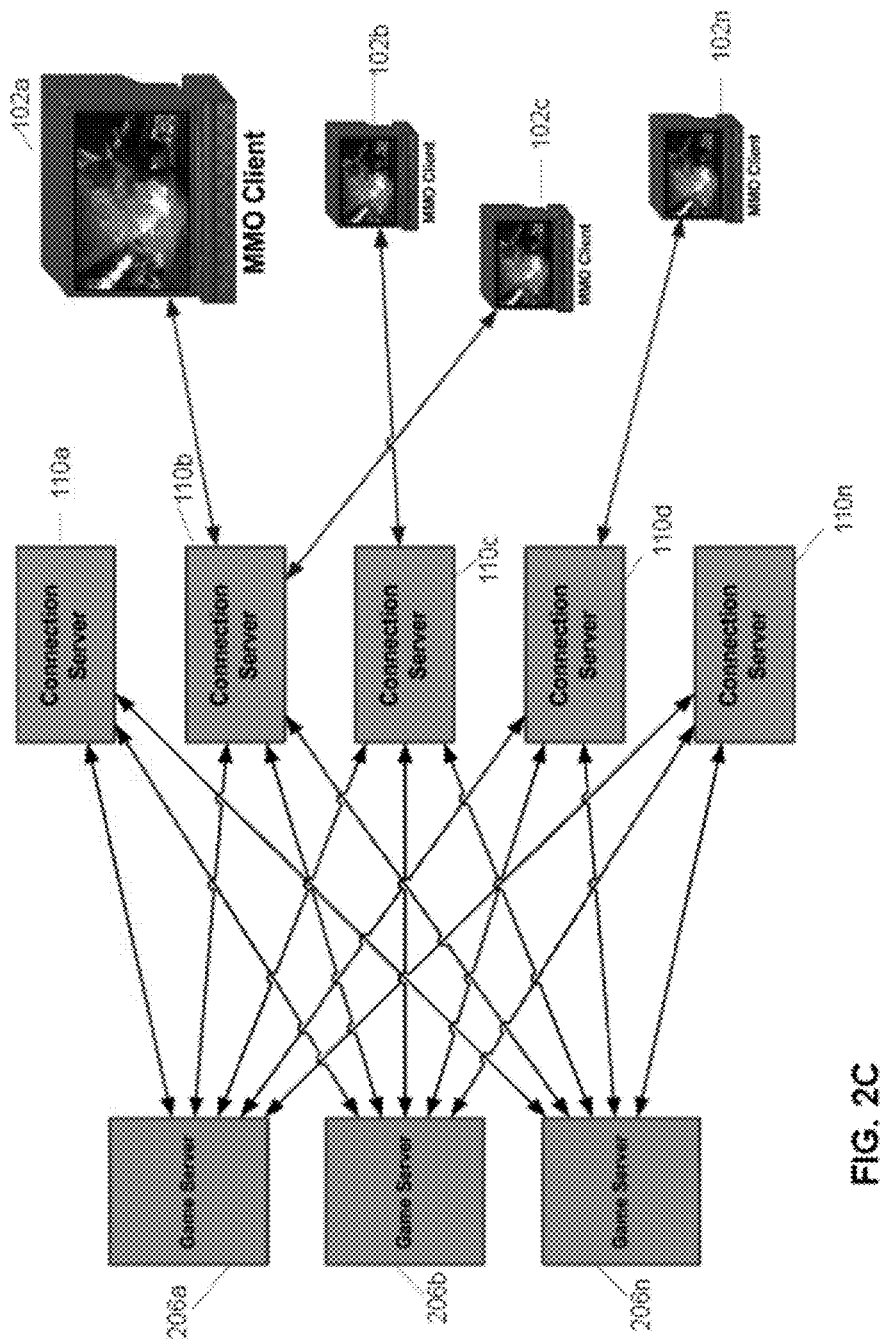
Figure 2D:
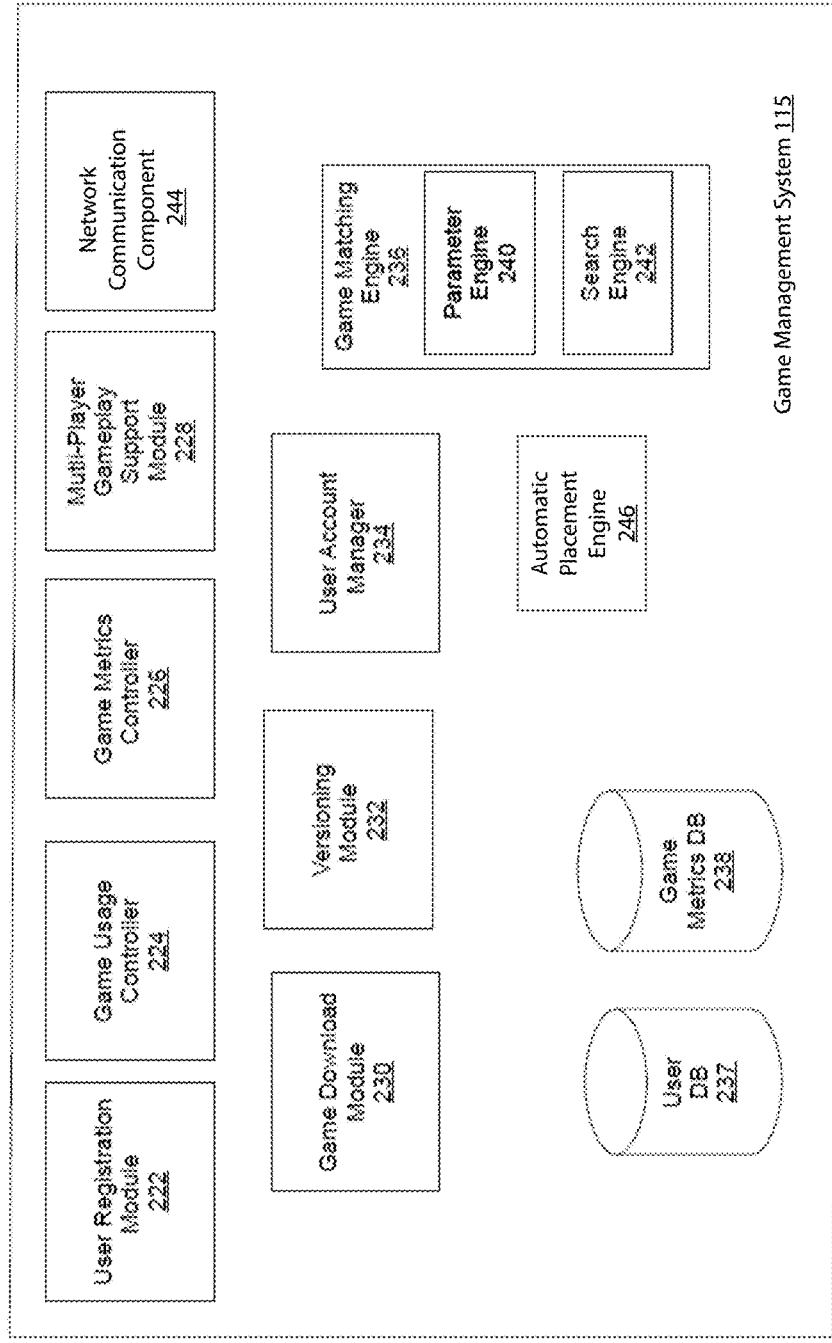

FIG. 2C is an example distributed network architecture for an MMO game server, configured to handle thousands of client connections without adding network overhead to the game servers 206a, 206b ... 206n. Client connections for clients 102a, 102b, 102c ... 102n can be increased and handled by adding new connection servers 110a, 110b, 110c, 110d ... 110n. Also, the number of connection servers 110a, 110b, 110c, 110d ... 110n can be independent of the number of game servers.

FIG. 2D is a block diagram of one embodiment of a game management system 115. The game management system 115 may include a user registration module 222, a game usage controller 224, a game metrics collector 226, a multiplayer gameplay supporter 228, a game download module 230, a versioning module 232, a user account manager 234, a game matching engine 236, a user database 237, a game metrics database 238, and/or various other modules not shown in FIG. 2D (such as a network communication component, an automatic placement engine, etc.).

In at least one of the various embodiments, the user registration module 222 is responsible for registering new users, storing identifying information of new users in the user database 237, and facilitating login of existing users. A user registration process may be invoked upon a user activation of a registration link on a web site associated with the game management system 115, upon a user request to download a game to the user's client device, upon a user attempt to begin playing a new game, or upon any other event initiated by the user. The user identifying information may include, for example, a user ID, a password, an email address, a unique code associated with a game product selected by the user, a handset ID (for wireless devices, etc.).

In at least one of the various embodiments, the game usage controller 224 is responsible for receiving information associated with a user purchase of a new game, storing this information in the user database 237, and controlling the usage of this game on various user devices.

In at least one of the various embodiments, the game metrics collector 226 is responsible for receiving game metrics from players of various games (e.g., various single and multiplayer games) and storing the game metrics in the game metrics database 238. The game metrics may specify, for example, the version of a played game product, the score of the game, how long the game was played, etc. The game metrics may be used by game producers and publishers to analyze gameplay and conduct data mining. The game metrics controller 226 may also be responsible for producing reports based on game metrics (e.g., reports by title and carrier to evaluate the performance of game products by titles and genre).

In at least one of the various embodiments, the multiplayer gameplay supporter 228 is responsible for providing multiplayer features across different device platforms (e.g., PC platforms, wireless device platforms, web-based handheld device platforms, game console platforms, etc.). The multiplayer features may include, for example, managing player turns in a multiplayer game session, supporting exchange of in-game chat messages, maintaining lobbies for different game products to allow game players to exchange information, searching for available players/teams and times, setting up head-to-head games, etc. In addition, the multiplayer gameplay supporter 228 may rank game players (e.g., based on losses, wins and difficulty of multiplayer games), provide player rankings to the users upon their requests, initiate (or allow users to initiate) tournaments and define (or allow users to define) criteria for participation in tournaments. In one embodiment, the multiplayer gameplay supporter 228 can be configured to periodically check whether each player is still connected to the network.

In at least one of the various embodiments, the game download module 230 is responsible for facilitating downloads of games to relevant client devices. In one such embodiment, the game download module 230 stores downloadable game code. Alternatively, the game download module 230 stores information on the external location of downloadable game code (e.g., URLs of the game code available for downloading). In one embodiment, the game download module 230 also facilitates downloads of non-application data such as MIDI files, Portable Network Graphics (PNG) files, etc.

In at least one of the various embodiments, the versioning module 232 is responsible for receiving data identifying versions of games possessed by the users, and determining whether new versions of corresponding game products are available. In one embodiment, the versioning module 232 sends messages to client devices to inform the users of the new game product versions and to indicate the location of the corresponding downloadable game code. Alternatively, the versioning module 232 may download game subcomponents (e.g., roster data, new graphics, modified levels, etc.) automatically, without involving the user in the download process (e.g., without specifying the location of the corresponding downloadable game code, etc.).

In at least one of the various embodiments, the user account manager 234 is responsible for collecting user account information from client devices, storing this information in the user database 237, and allowing web-based user login to their accounts. The user account information may include, for example, a list of games owned, user rankings, ladders, message boards, system information, user gaming preferences, etc.

In at least one of the various embodiments, the game matching engine 236 is responsible for finding multiplayer game sessions that may be of interest to a user and providing user access to these multiplayer game sessions. Multiplayer game sessions referred to herein are also known as "game lobbies" or "draft pools" where players are waiting to play relevant multiplayer games. The game matching engine 236 finds attractive multiplayer game sessions for a user based on game metrics and preferences of the user. The game matching engine 236 comprises a parameter engine 240 which allows a user to configure "Sets of Parameters," "List(s) of Sets of Parameters," ("List(s)") and conditionals for game searching using a search engine 242 as described herein.

In at least one of the various embodiments, the network communication component 244 is coupled to the processor and adapted to return a prioritized list of potential gaming experiences at a user interface (not shown) of the user's client device. In the embodiments, the prioritized list order is based on the user-selected parameters and conditionals.

In at least another of the various embodiments, an automatic placement engine 246 may be part of one or more of the other controllers, modules, managers, or engines of the game management system 115. The automatic placement engine 246 is stored in the memory and operable on the processor to automatically place a player (e.g., the user's client device) in a gaming experience that meets the user-selected parameters and conditionals. For example, the user can select to be automatically placed in a game based on the results (the top result, for example) of the search.

Generalized Operation

The operation of certain aspects of the invention will now be described with respect to FIGS. 3-6. In at least one of the various embodiments, processes described in conjunction with FIGS. 3-6 may be implemented by and/or executed on a single network computer, such as a game management system. In other embodiments, these processes or portions of these processes may be implemented by and/or executed on a plurality of network computers, such as client machine, game management server, connection server, or game networking server of FIGS. 1-2D. Likewise, in at least one of the various embodiments, processes 300, 400, 500, 600 or portions thereof, may be operative on one or more client computers, such as the client computer(s) of FIGS. 1-2C. However, embodiments are not so limited, and various combinations of network computers, client computers, virtual machines, or the like may be utilized. Further, in at least one of the various embodiments, the processes described in conjunction with FIGS. 3-6 may be operative in systems with logical architectures such as those described in conjunction with FIGS. 1-2D.

Targeted Game Searching and Matching Using Sets of Parameters

Figure 3:
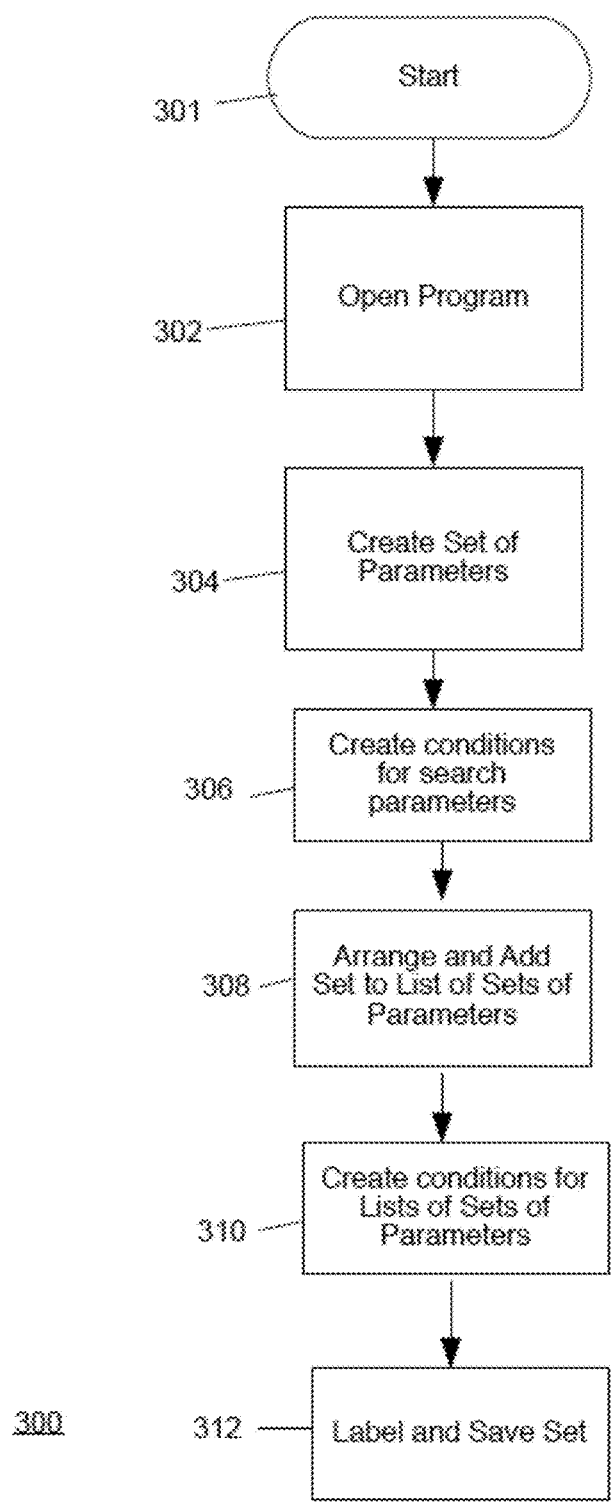
FIG. 3 shows a flowchart of an example embodiment.

FIG. 3 illustrates an overview flowchart for process 300 for searching single and/or multiplayer games across multiple titles. In certain embodiments, games can be searched simultaneously for a desired game experience, based for example on map, mode, and game defining characteristic filters.

In at least one of the various embodiments, after a start block 301, at block 302 the system is configured to open a program for a navigable interface configured for searching for a gaming experience. In at least one of the various embodiments, the system is configured to search that user's game library for a gaming experience, although in embodiments the system can also be configured to search other games and game databases, for example, games a game developer or company offers for free, as part of a subscription plan, as part of a promotion, or games in one or more other game databases. The system can also be configured to search the game libraries for one or more game platforms, and any subset of the gaming libraries thereof.

In at least one of the various embodiments, at block 304, the system is configured to allow a user to input game search parameters to create a Set of Parameters. The system can include filters configured to allow a user to craft narrow or broad game search parameters. Each individual Set of Parameters is separate from the others. Exemplary parameters comprise "time," "# of players online," "connection quality," and "total searched games."

In one of the various embodiments, at block 306 the system is configured to allow a user to set conditions for each of the search parameters. For example, the system can be configured with a parameter to indicate a preference for creating an offline game with online content if an online game is not available or does not exist. In one of the various embodiments, the system can be configured to create a conditional for creating an offline game experience for the user after a predetermined time of search time has passed, for example after five total minutes of search time has passed. Thus, in at least one of the various embodiments the system can be configured to allow a user to set the time after which an offline game is created for the user.

In at least one of the various embodiments, at block 308, the system is configured to allow the user to add the "Set of Parameters" (hereafter "Set(s) of Parameter(s)") into an arrangeable "List of Sets of Parameters" (hereafter "List(s)" or "List of Sets of Parameters") to arrange and add to the priority of the chosen Sets of Parameters. For example, in at least one of the various embodiments, the system is configured to allow the user to arrange Sets of Parameters by priority of search, for example, using order of the Sets of Parameters on the List. The List comprises slots in which a user can arrange a plurality of the Sets of Parameters. For example, the system can be configured to prioritize the List order from most preferred (top or first) to least preferred (bottom or last). The system can be configured to perform the searches or at different intervals, which can be preconfigured, configured by the user, or both.

In at least one of the various embodiments, at block 310 the system is configured to allow a user to create and/or add conditions for searching the Lists, for example, setting conditions for when a Set of Parameters takes top preference. For instance, a Set of Parameters may have the top priority (e.g. first on the List) unless the conditional for another lower priority Set of Parameters is fulfilled. For example, for a Set of Parameters for MMO searching, the system can be configured to prioritize any parameter fulfilling an "InGame" condition: i.e.: "this parameter set takes top preference whenever two weeks of in-game time has elapsed from last login." Thus a game experience that is not normally the most preferred experience for a user can be prioritized when the conditional is filled.

As another example, in at least one of the various embodiments, single-player games are configured with a "single-player" condition. As single-player games are by default always available to be played, the system can have a conditional configured to incorporate single-player games in a search, for example, by only serving or generating a single player game after a predetermined time has elapsed without returning a multiplayer game (e.g., "after five minutes of 0 returned matches a single-player experience will be generated").

In at least one of the various embodiments, the system can comprise a "Nostalgia" or "Nostalgic Shuffle" conditional configured to allow a user to search and play a game using a Set of Parameters that has not been used for a time period, for example by giving a dormant Set of Parameters top priority on a search bar.

In at least one of the various embodiments, the system can comprise a "Game Day Marathon" conditional, which automatically begins searching for a new experience once the current one has ended. For example, when a player finishes a mission or a round of combat in a given game, the search engine will automatically begin searching instead of requiring a player to manually begin the search. The player may choose to either receive a prompt for a Set of Parameters that returns a positive search result, and may choose to play or skip that game experience. In an embodiment, the player can also choose to be automatically placed into the first game match result and returned experience, in which case the player skips manually choosing via a "play or skip" prompt and is instead placed directly into the experience. The Game Day Marathon conditional can be configured to automatically prioritize multiple matches in order of the List.

In at least one of the various embodiments, the system can comprise a "Player Preference" condition, configured to verify that the experience being played satisfies a Set of Parameters on the List. Should a game change such that it does not satisfy the any Sets of Parameters on the List, the system can be configured to perform a new search.

In at least one of the various embodiments, at block 312, the system is configured to allow the user to label and save the Set of Parameters in a "Saving & Labeling" interface, which is configured to allow a user to use the same search at another time. Once a user is satisfied with the configuration for the List, the user can save it and give it a name. Thus the system is configured to allow the user to reuse the search parameters to search for a specific game experience at any time.

Generation of Offline Game Experience

In at least one of the various embodiments, the system is configured to generate an offline game experience including online features. For example, when a desired online experience does not exist or is unavailable. In at least one of the various embodiments, the system is configured to sync the offline experience with an online experience via a single user profile. In at least one of the various embodiments, the generated offline experience can be saved and played separately from the online experience. As used herein, "offline game experience" means, inter alia, that the client can generate a game experience that can be played without requiring an online connection to a game server, regardless of whether or not the client is online.

Offline Game Experience in Search

Figure 4:
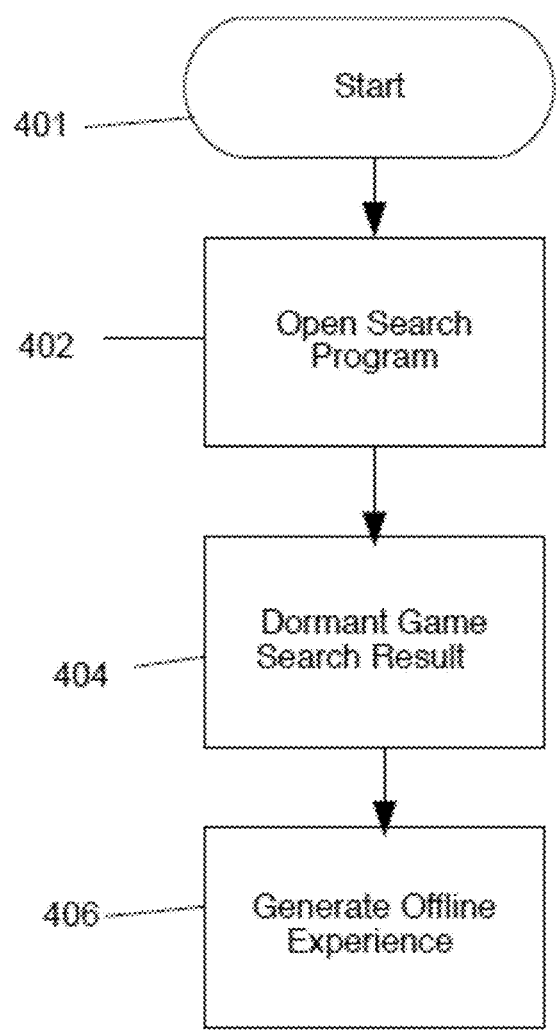
FIG. 4 shows a flowchart of an example embodiment.

FIG. 4 illustrates an overview flowchart for process 400 for an offline game experience. In at least one of the various embodiments, after a start block 401, at block 402 the system opens a search program. In at least one of the various embodiments, the game search engine can search single player, multiplayer, and MMO game experiences, including as described herein. In at least one of the various embodiments, at block 404, if the system produces a dormant or unavailable game result for a game the user prefers, at block 406 the system is configured to generate an offline game with online features, should the game experience be nonexistent and/or not-available online. This allows players to access "online" content that may have been offline for several years. Hence the system is not dependent on current and active servers to be online to function, as it can locally generate this game functionality. Thus, the system can be configured to simultaneously search one or more game platforms for single player, multiplayer and MMO game experiences with the local creation of an offline experience with online content.

Figure 5:
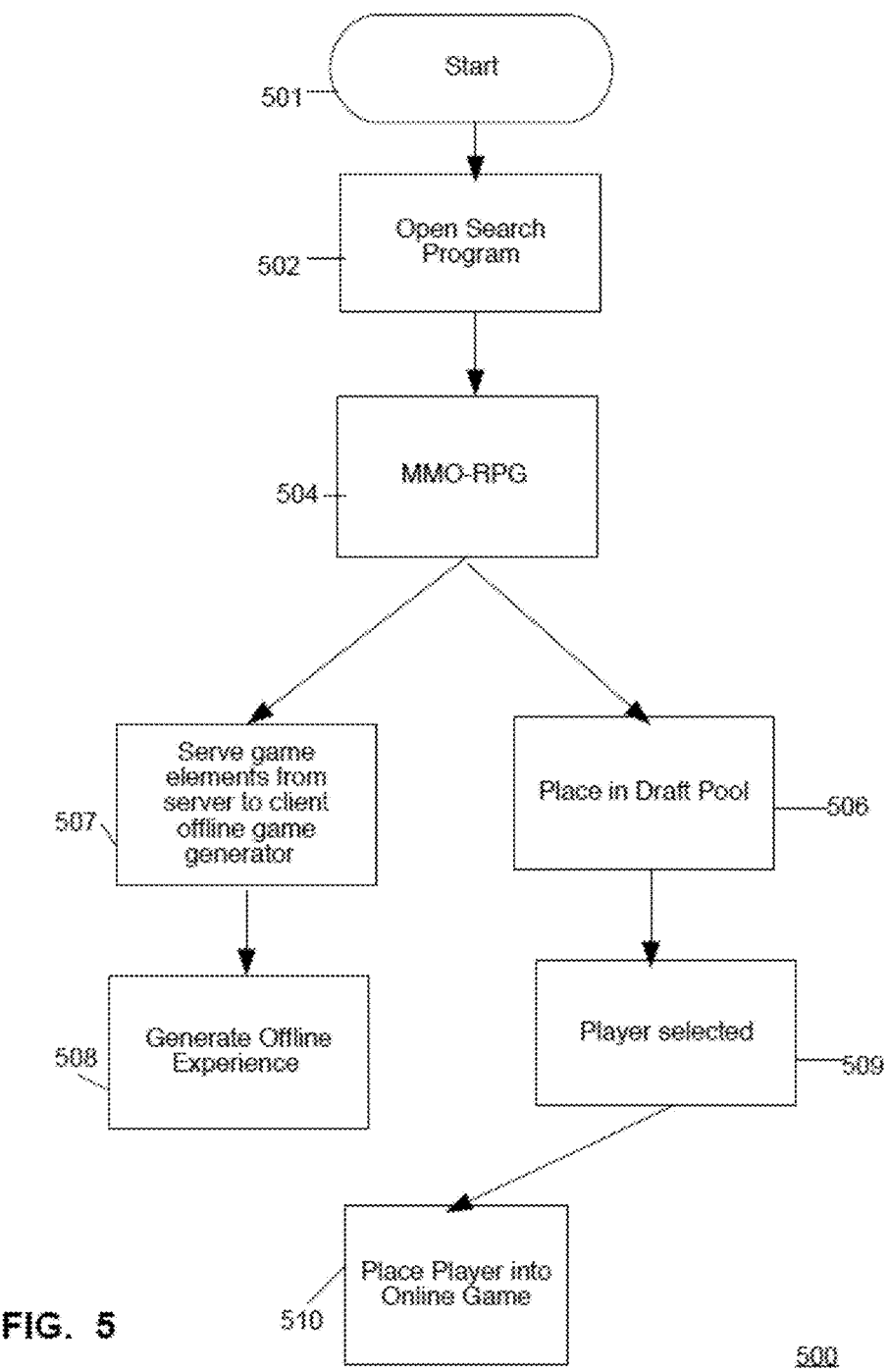
FIG. 5 shows a flowchart of an example embodiment.

FIG. 5 illustrates an overview flowchart for process 400 of an offline game experience in combination with a Search. In at least one of the various embodiments, the offline experience can be generated in combination with a user's online profile for a game platform. In at least one of the various embodiments, after a start block 501, at block 502, the user opens a search program. A search or saved search can be matched with an experience that is available using, for example, a Set of Parameters or conditions as described herein. For example, at least one of the various embodiments, at block 504 if a user search or Set of Parameters search prioritizes an MMO-RPG match, the search can be configured to include an MMO-RPG for a single player and multiplayer game search. If a user indicates a preference to play with others (e.g., "player vs. player" or "questing"), then at block 506 the system is configured to place the user into a "Draft Pool," where they can be paired up with other players. In at least one of the various embodiments, at block 508 the system can be configured to generate an offline, single player experience for the game that simulates the MMO-RPG until the place in the Draft Pool is matched.

In at least one of the various embodiments, if needed, at block 507 the system is configured to provide server game elements for generating gameplay on a game client to an offline game generator. In at least one of the various embodiments, the game client may already include gameplay elements needed for an offline game, previously downloaded or installed in the game client, and may not need server side elements to generate the offline game experience. Once the elements are downloaded to the client, the client can generate the offline game experience. At block 508, the system generates an offline, single player experience for the game that simulates that of an MMO, for example the MMO-RPG.

Figure 6:
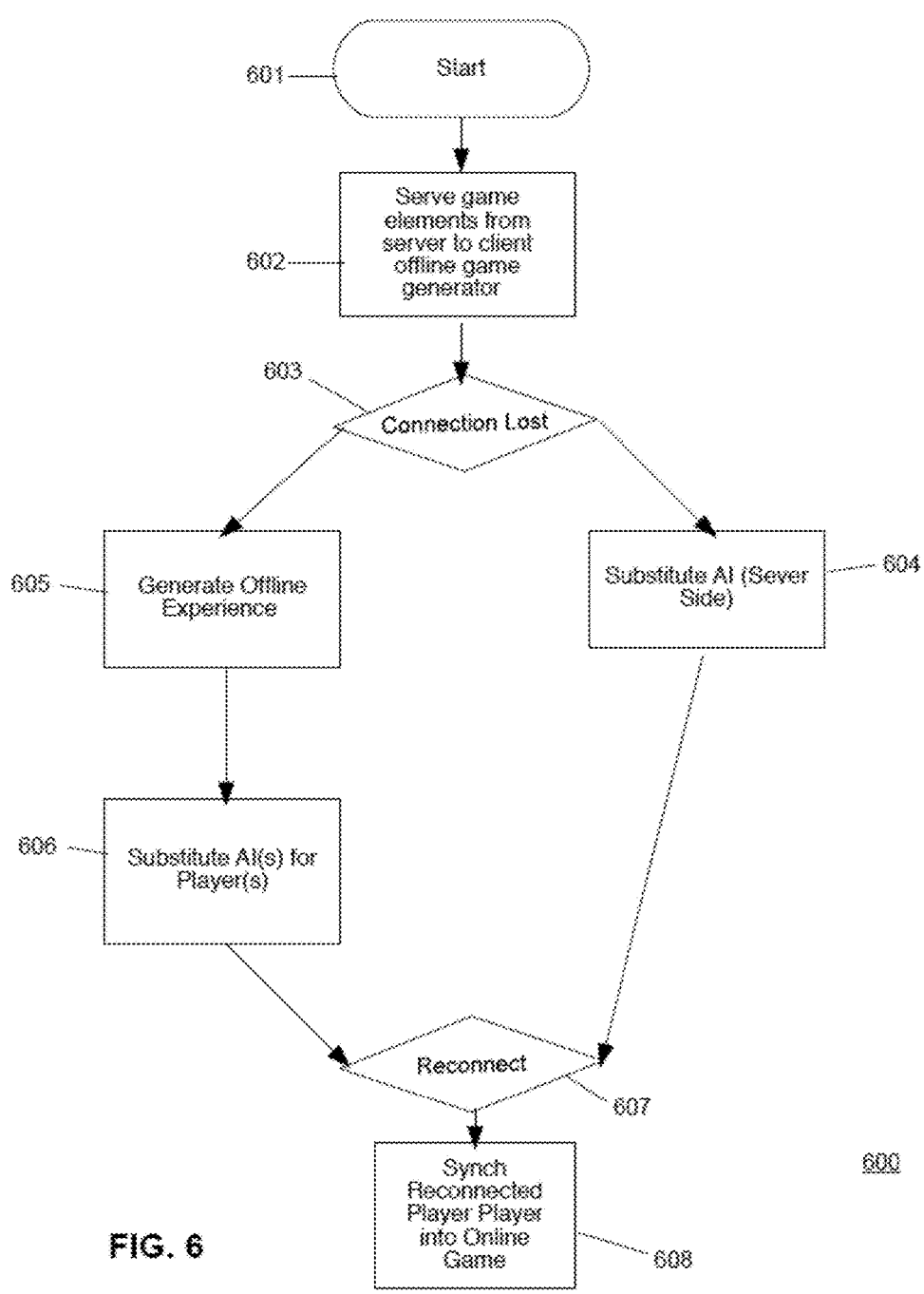
FIG. 6 shows a flowchart of an example embodiment.

FIG. 6 illustrates an overview flowchart for process 600 of an offline game experience in combination with a search. In at least one of the various embodiments, after a start block 601, at block 602 the system is configured to provide server game elements for generating gameplay on a game client to an offline game generator. As long as the player is online, server side player activity continues as normal, including player interactions with game objects and other real player objects/avatars taking place on and mediated with the game server. In at least one of the various embodiments, at block 602, during online gameplay, the system is configured to serve server side information to the offline game generator on the game client if needed. Should the connection with the server be lost, the offline game generator on the client is configured to locally generate a seamless game experience in place of the one that the player lost connection to, including the use of game elements downloaded from the server at block 602. In at least one of the various embodiments, at block 606, the client game generator can be configured to replace other player objects from the multiplayer game on the server with Artificial Intelligence (AI) controlled objects.

In at least one of the various embodiments, user profile data for players can be used to download gameplay elements to the local game generator to simulate AI substitution players in the online experience. For example, user profile data for players may indicate the player has an experience rank (e.g., "Noob," "Expert," "Master"; badges; missions completed, etc.). In another embodiment, the system may track player time and game accomplishments to score the player's level (e.g. from 1-100). Thus the system can serve such user profile information to the local game generator at the client so the local game generator replaces each prior online player with a corresponding AI player that would be generated for a single player game at that difficulty level. If during the online game a player's online MMO-RPG game experience included, for example, 2 other online players that were experts or had high user profile scores and 2 other online players that were Noobs or had low user profile scores, the local game generator would replace them with 2 expert level AI players and 2 beginner level AI players, respectively.

In at least one of the various embodiments, at block 604, the server side multiplayer game can also have an AI player substitute for a player that loses connection. In at least one of the various embodiments, should a connection be reestablished at block 607, at block 608 the system can be configured to have the player rejoin the match, provided the configured game play of the game engine allows it (e.g., if the server can reaccept the player into the game due to an open space for a player, or the AI player is still "alive" and hence game play would remain fair).

In at least one of the various embodiments, user profile data for a player's offline and online profile can be synced together regardless of whether the client is online or offline. In embodiments online and offline, user profiles can be kept separate. As noted above, the system can be configured to include a component that implements AI players to realistically resemble players of varied skill levels to reflect the present and or past online player base. The system can be configured to keep online and offline profiles separate for competitive fair play. For example, in an embodiment, the system can be configured to determine which AI program was used before accessing online content after being offline, and should the program not be approved per game developer or owner guidelines to provide an "acceptable level of competition," then the perks, badges, or player advantages earned offline will remain as such and only available to the offline profile.

Illustrative User Interface Use Cases

FIGS. 7-13 represent graphical user interfaces for game searching with at least one of the various embodiments. In at least one of the various embodiments, user interfaces other than user interfaces shown in FIGS. 7-13 may be employed without departing from the spirit and/or scope of the claimed subject matter. Such user interfaces may have more or fewer user interface elements, which may be arranged in various ways. In some embodiments, user interfaces may be generated using web pages, mobile applications, gaming applications, or the like. In at least one of the various embodiments, the game engine may include processes and/or API's for generating user interfaces, such as user interfaces shown in FIGS. 7-13.

Figure 7:
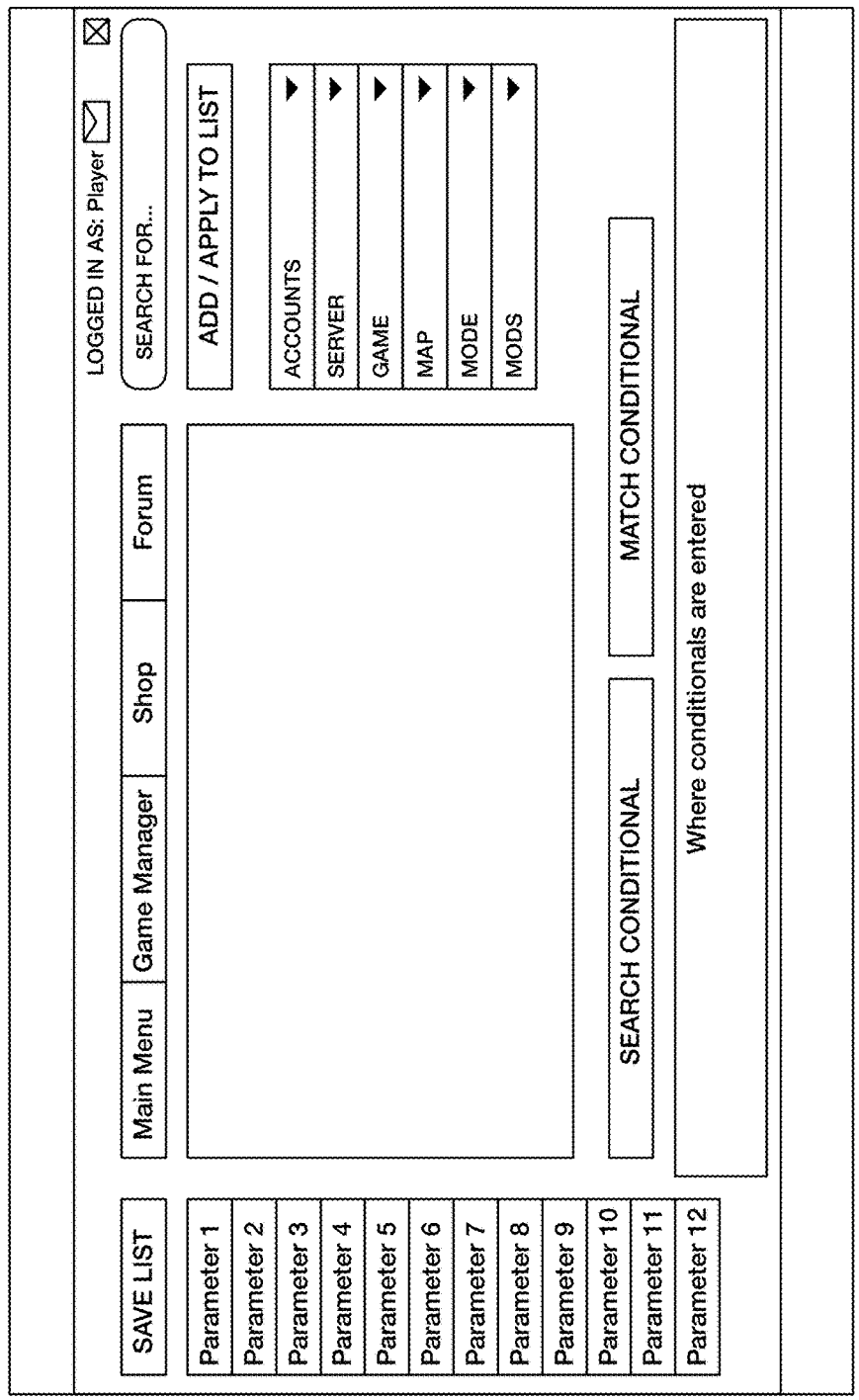
FIG. 7 shows an exemplary graphic user interface for an embodiment.

In at least one of the various embodiments, FIG. 7 shows a graphical user interface for a "Create a New Search" window. The GUI includes a parameter area including a List of Parameters on the left side of the window. Parameters are configured to allow a user to define ideal game matches they would like to play, listed from most favorable to least favorable by default. A "Search Conditional" and/or "Match Conditional" area is configured to show a visual or icon representing a searched or selected game experience, for example a game map or a game logo. The visual is associated with the step or stage of the player's selection process; for example if a player is selecting a map, the interface is configured to show a picture of the map currently selected/ highlighted on a drop down menu.

A menu area includes one or more drop down menus. As shown in FIG. 7, the GUI is configured with drop down menus for parameter types including: "Accounts," "Servers," "Games," "Maps," "Modes," and "MODs." The system is configured to create a parameter from each parameter type via an "Add/Apply to List" input.

Figure 8A:
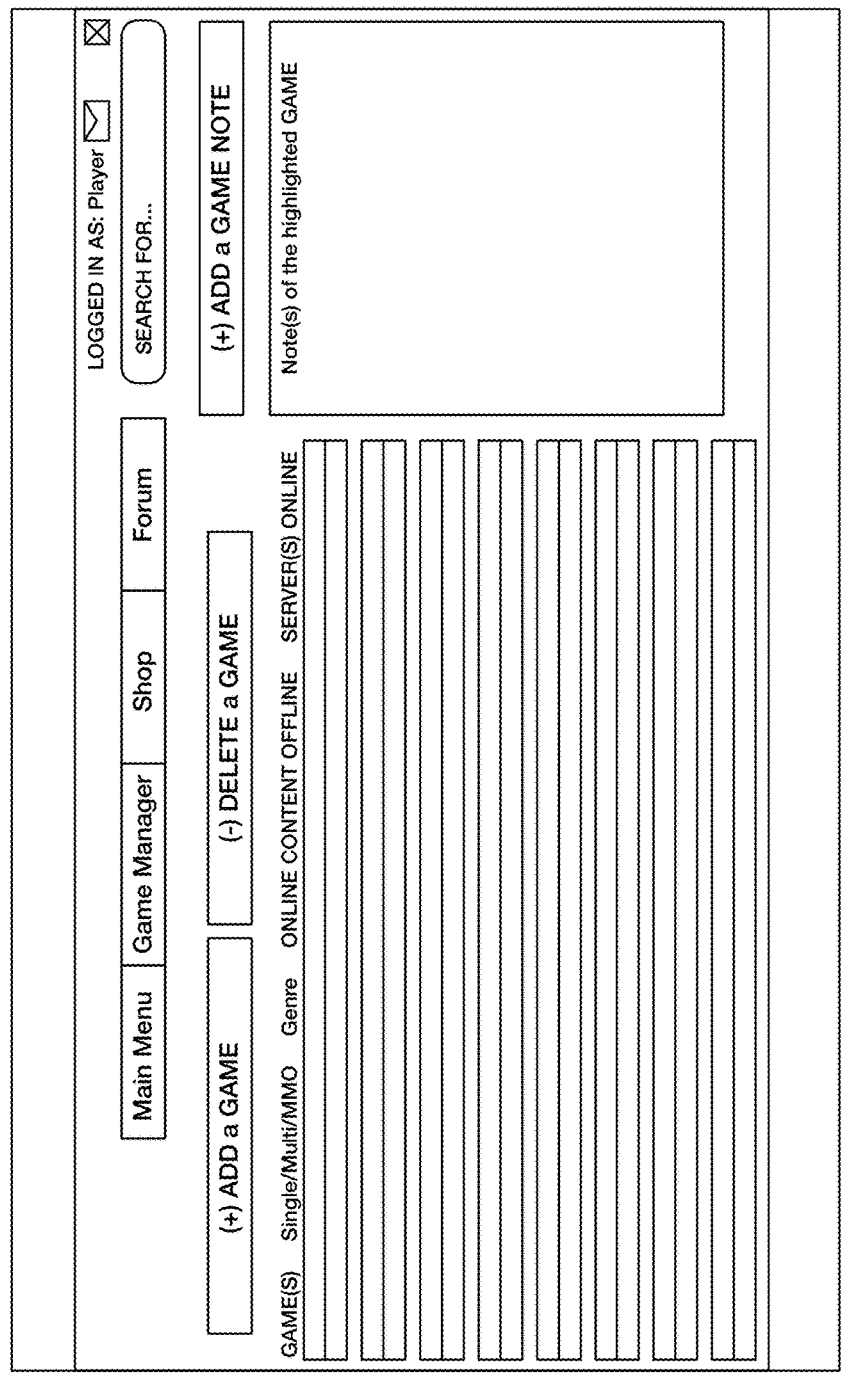
FIGS. 8A-8B show exemplary graphic user interfaces for an embodiment.

FIG. 8A shows an example of a parameter menu for a "Game Parameter." In an embodiment, the system is configured to allow a user to select, add and delete games from a search, as well as "Add a Game Note" where the user can add information about the game. Default game information can include the game name, game type ("Single/Multi/MMO"), "Genre," whether online content is available offline, and servers online. The system is configured to employ the Game Parameter for preferring a game based on the Game selected.

Figure 8B:
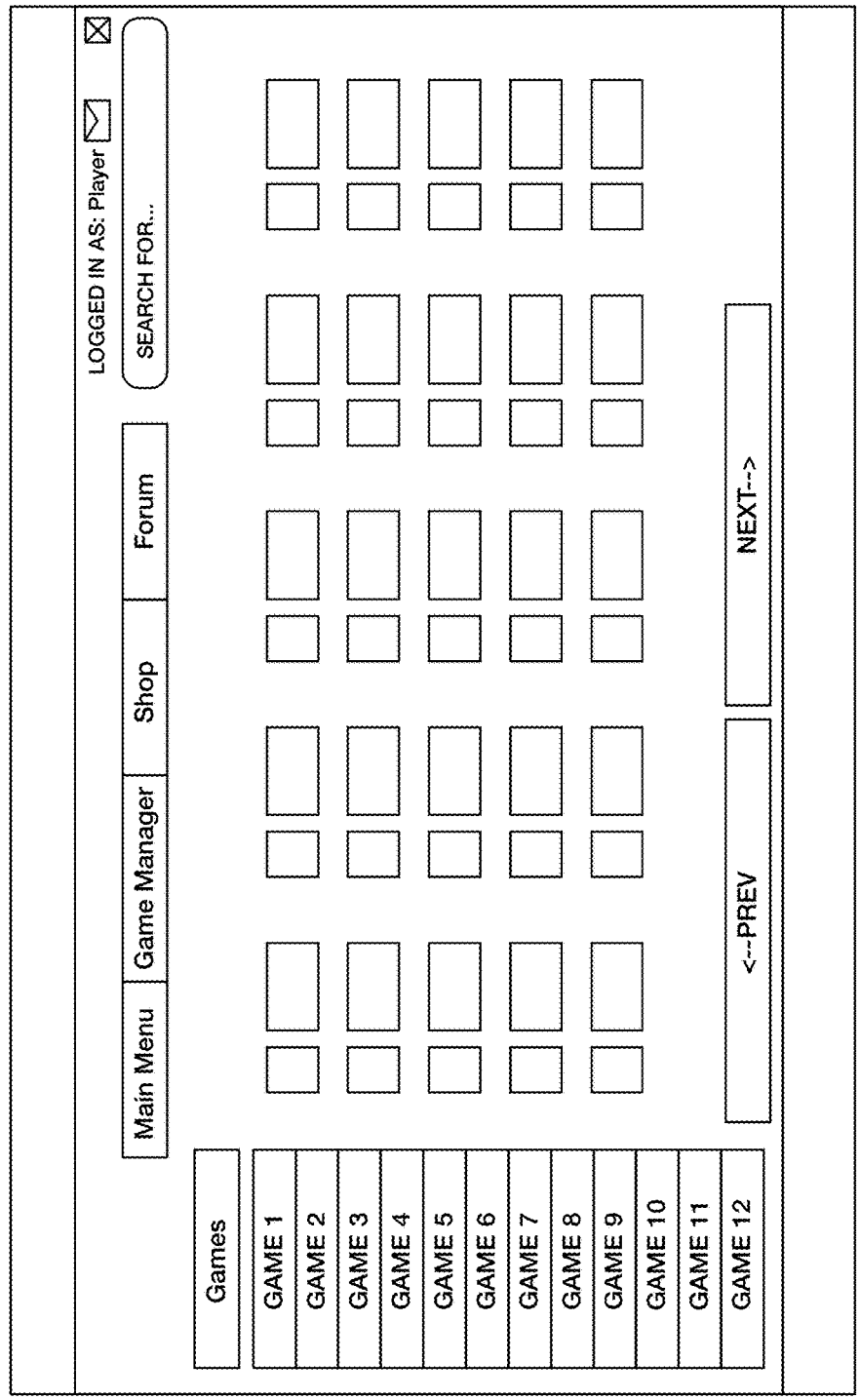

FIG. 8B shows an example of a parameter configuration menu for the Game Parameter. In an embodiment, the system is configured to allow a user to select a game from a game menu (Game 1, Game 2 . . . Game n) along with one or more selectable "basic selection" items on a "basic selection" menu. The system is configured to narrow the Parameter for preferring a game based on each selected item, (e.g. select game only if x arena is available, select game only if level x or above is available, select only "Quest," etc.). If none of the basic selection items are chosen, the search defaults to include all possible selections for the game experience of that game.

For example in at least one of the various embodiments, a user selects three games from the user's library, Alpha, Bravo, and Charlie. Then the user selects the map and mode filters to search for the maps "one," "two," and "three" in modes "circle," and "square." The system is configured to search through each of the games, Alpha, Bravo, and Charlie, for each of the maps "one," "two," and "three" in modes "circle" and "square" simultaneously. Then the system is configured to allow the user to view or use the results either by list or to be automatically placed in a match. The list will show the first matched search at the top (e.g., of the user interface, etc.), or the automatic format will place the player in the first returned matched search (e.g., via an automatic placement engine, or the like).

Figure 9:
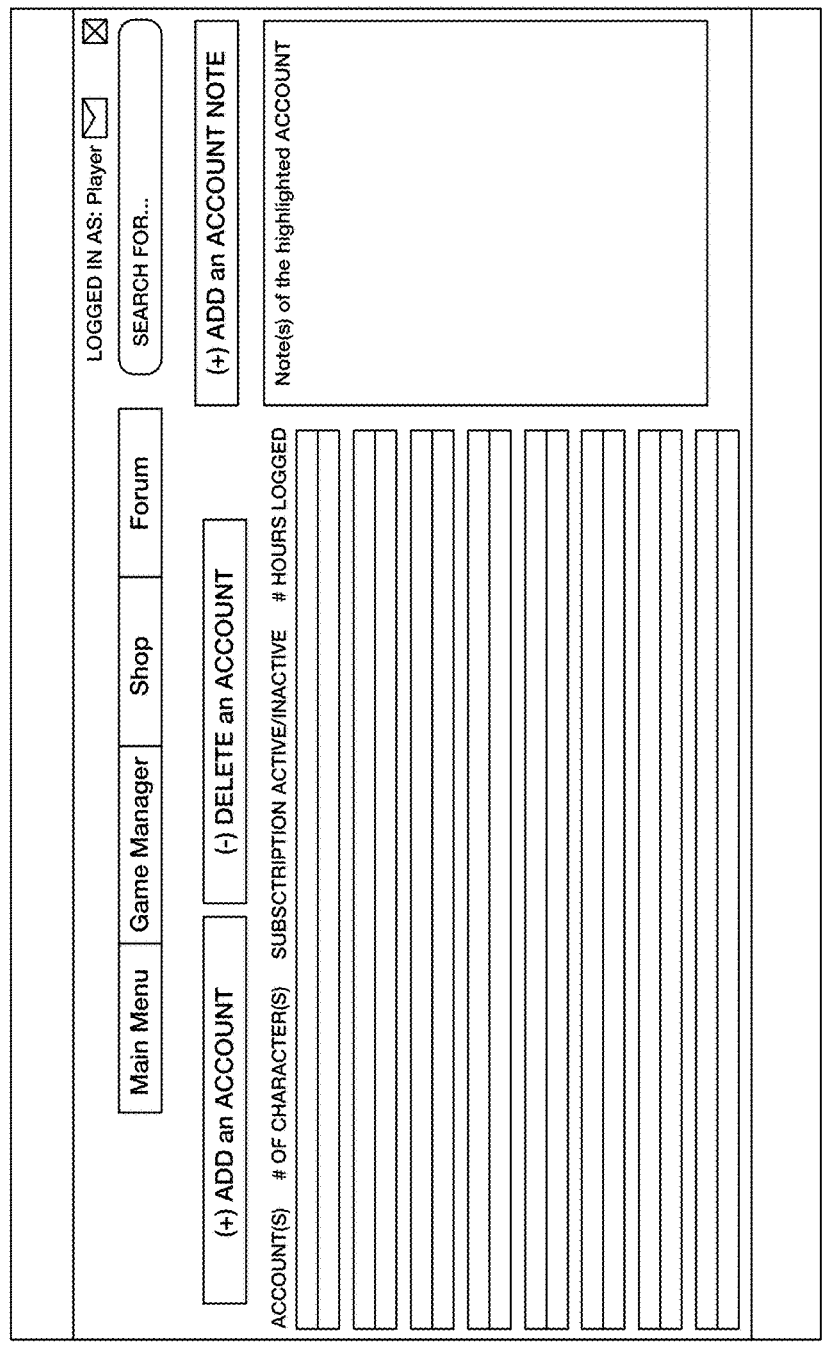
FIG. 9 shows an exemplary graphic user interface for an embodiment.

FIG. 9 shows an example of a parameter menu for an "Account Parameter." In an embodiment, the system is configured to allow a user to select, add and delete game accounts from a search, as well as "Add an Account Note," where the user can add information about the account. Default account information can include the account name, number of characters associated with the game account, subscription status, and number of hours logged. The system is configured to employ the Account Parameter for preferring a game based on the account(s) selected.

Figure 10:
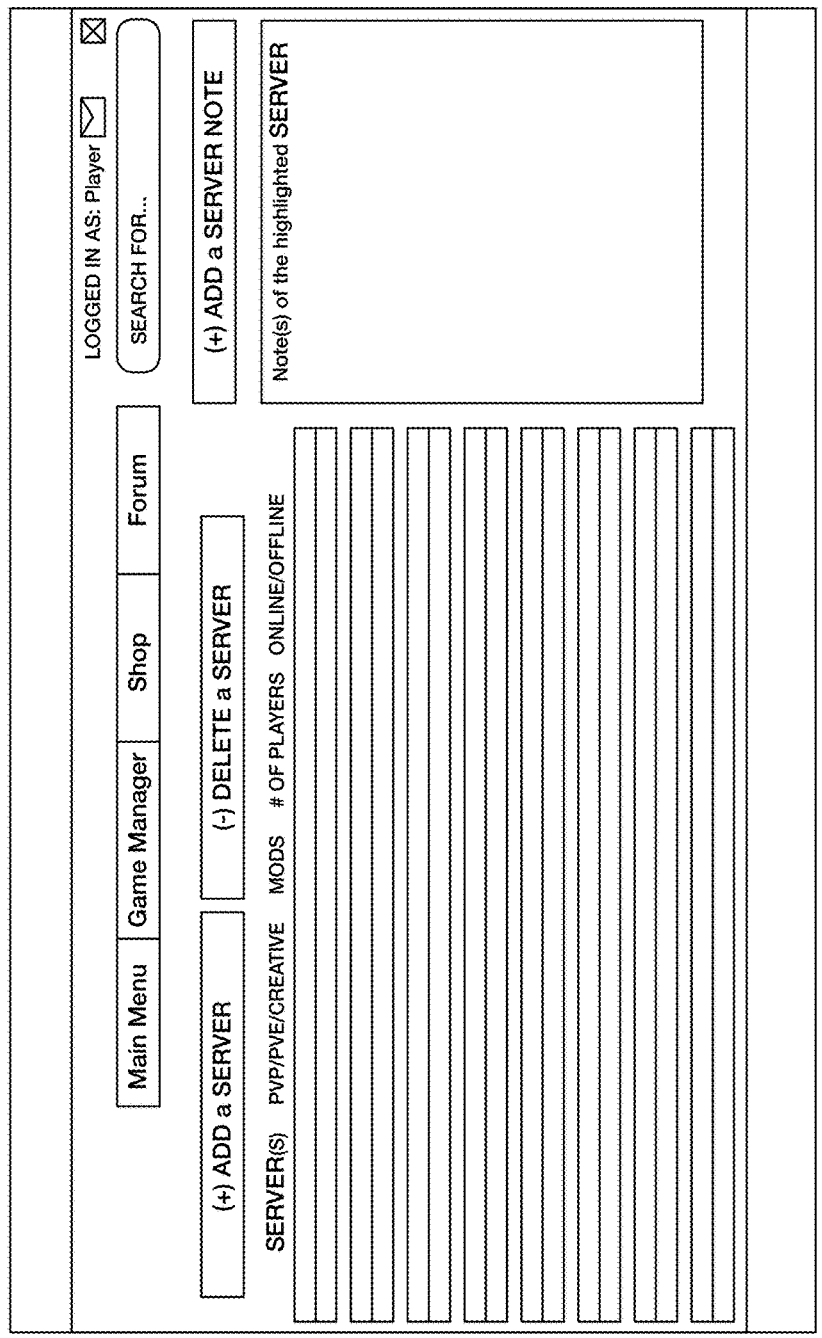
FIG. 10 shows an exemplary graphic user interface for an embodiment.

FIG. 10 shows an example of a parameter menu for a "Server Parameter." In an embodiment, the system is configured to allow a user to select, add and delete game servers from a search, as well as "Add a Server Note," where the user can add information about the Server, Default Account information about the server name, "PvP/PvE/Creative," "MODs," "Number of Players," and "Online/Offline." The system is configured to employ the Server Parameter for preferring a game based on the server(s) selected.

Figure 11:
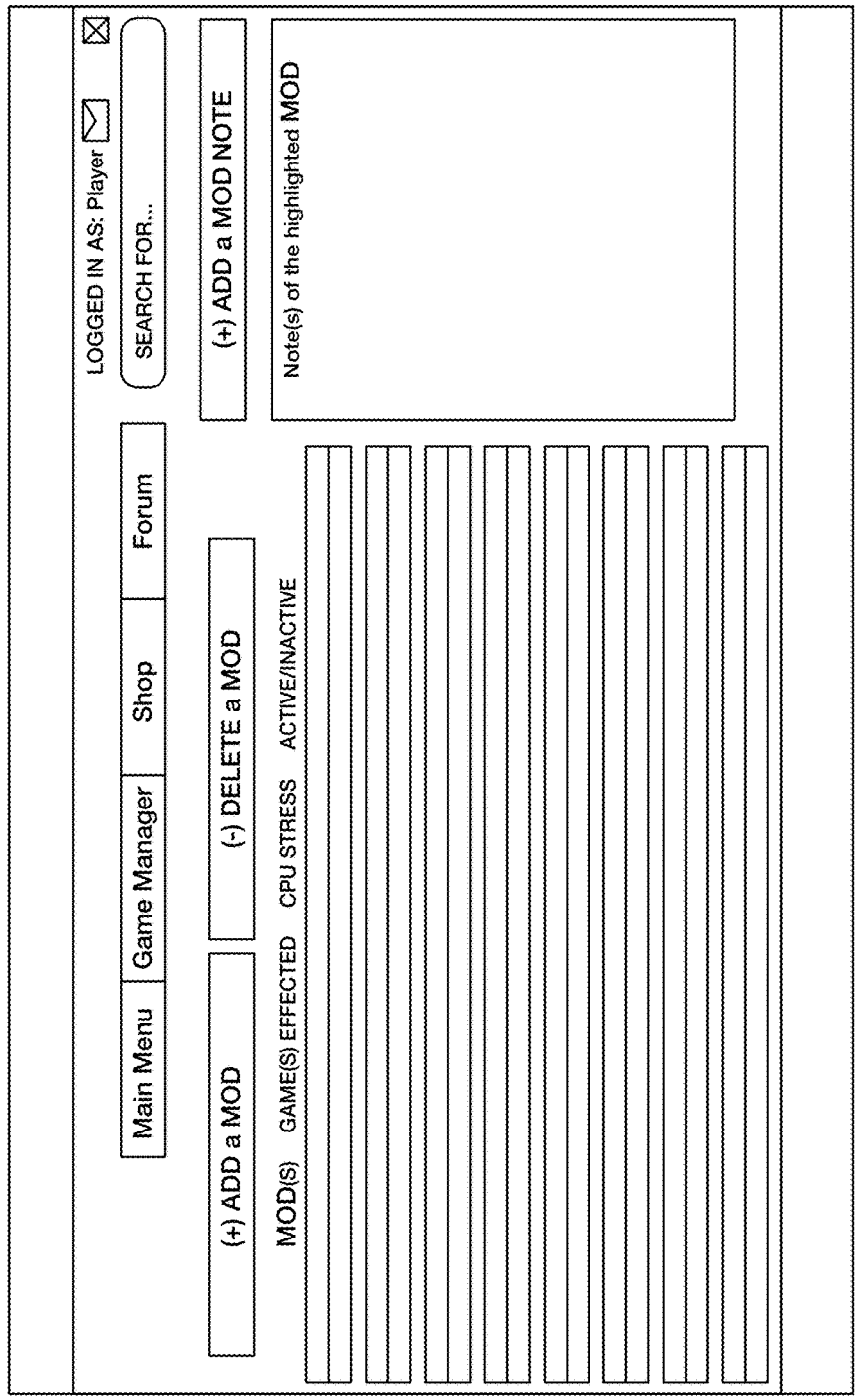
FIG. 11 shows an exemplary graphic user interface for an embodiment.

FIG. 11 shows an example of a parameter menu for a "MOD Parameter." In an embodiment, the system is configured to allow a user to select, add and delete MODs from a search, as well as "Add a MOD Note," where the user can add information about the MOD, Default Account information about the MOD name, "Games Effected," "CPU Stress," and "Active/Inactive." The system is configured to employ the MOD Parameter for preferring a game based on the MOD(s) selected.

Returning to FIG. 7, the GUI includes a "Match Conditional" input icon configured to allow a user to create tailored conditions, for example such as "when [x condition] exists, Parameter 3 gets top priority." Once the user has finished configuring the parameter, the user adds the parameter to the List via an "Add/Apply to List" input icon, and the system adds the advanced search parameter to the List.

The GUI comprises a "Search Conditional" input icon configured to allow a user to create search and add conditionals for a List of Sets of Parameters. As described herein, a conditional can be set for an individual parameter or parameters on a List. For example, a conditional can be configured to hold a "true" conditional for an entire List such as, "every 5th search start from the middle of the Set of Parameters." Once the user has finished configuring the parameter conditional or List conditional, the user adds the conditional via an "Add/Apply to List" input icon, and the system adds the advanced search parameter to the List.

Figure 12A:
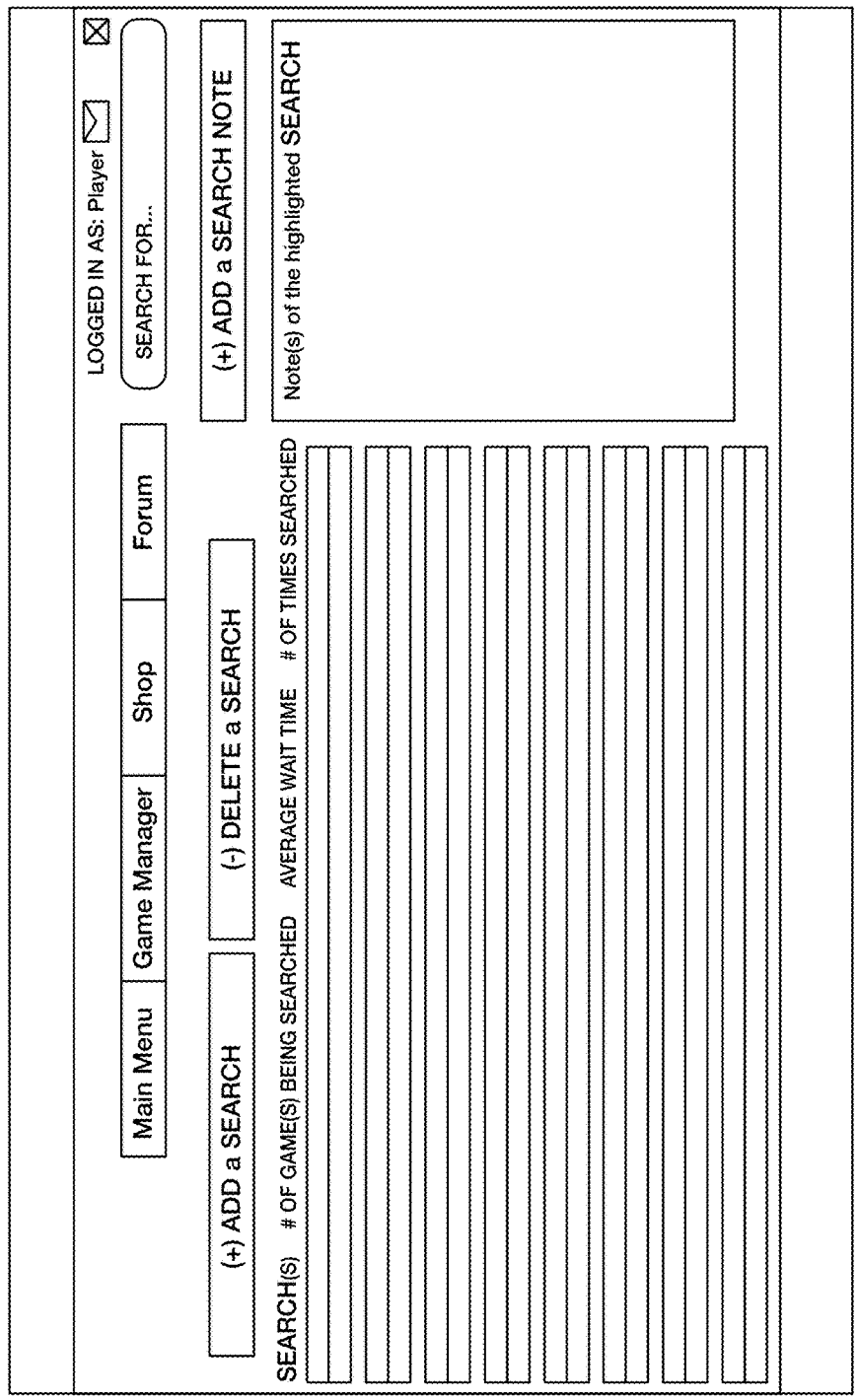
FIGS. 12A-12B show exemplary graphic user interfaces for an embodiment.
Figure 12B:
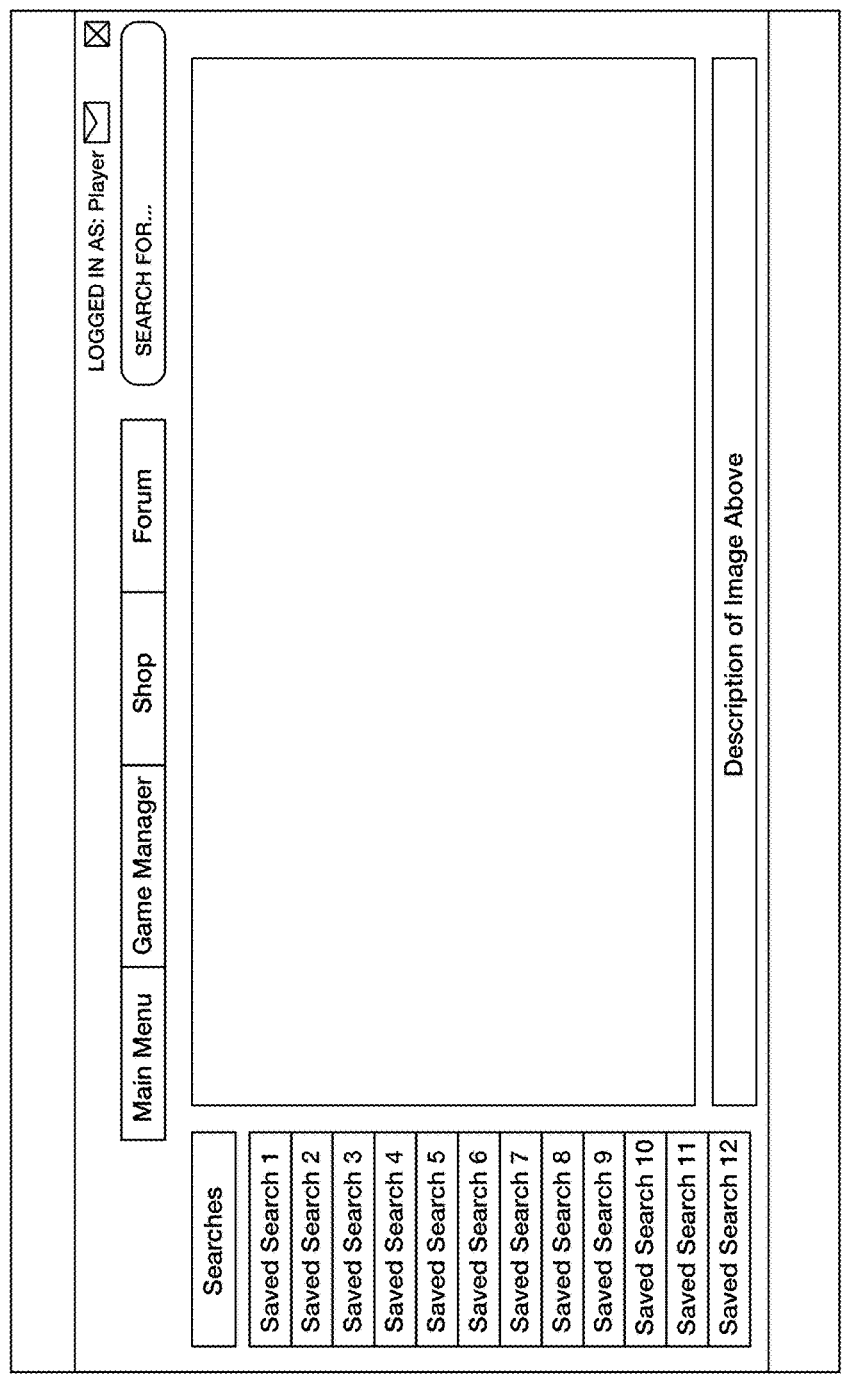

FIGS. 12A and 12B show examples of GUIs for saving searches performed by the system as described herein. In an embodiment, as shown in FIG. 12A, the system is configured to allow a user to select, add and delete searches performed by the system, as well as "Add a Search Note," where the user can add information about the search (e.g., games added, special conditionals, anything noteworthy about the List or the parameters used for the search, etc.). Default search information can include the search name, number of games searched, average wait time, and number of times search performed. An exemplary GUI for previous saved searches (Saved Search 1, Saved Search 2 . . . Saved Search N) is shown at FIG. 12B.

Figure 13:
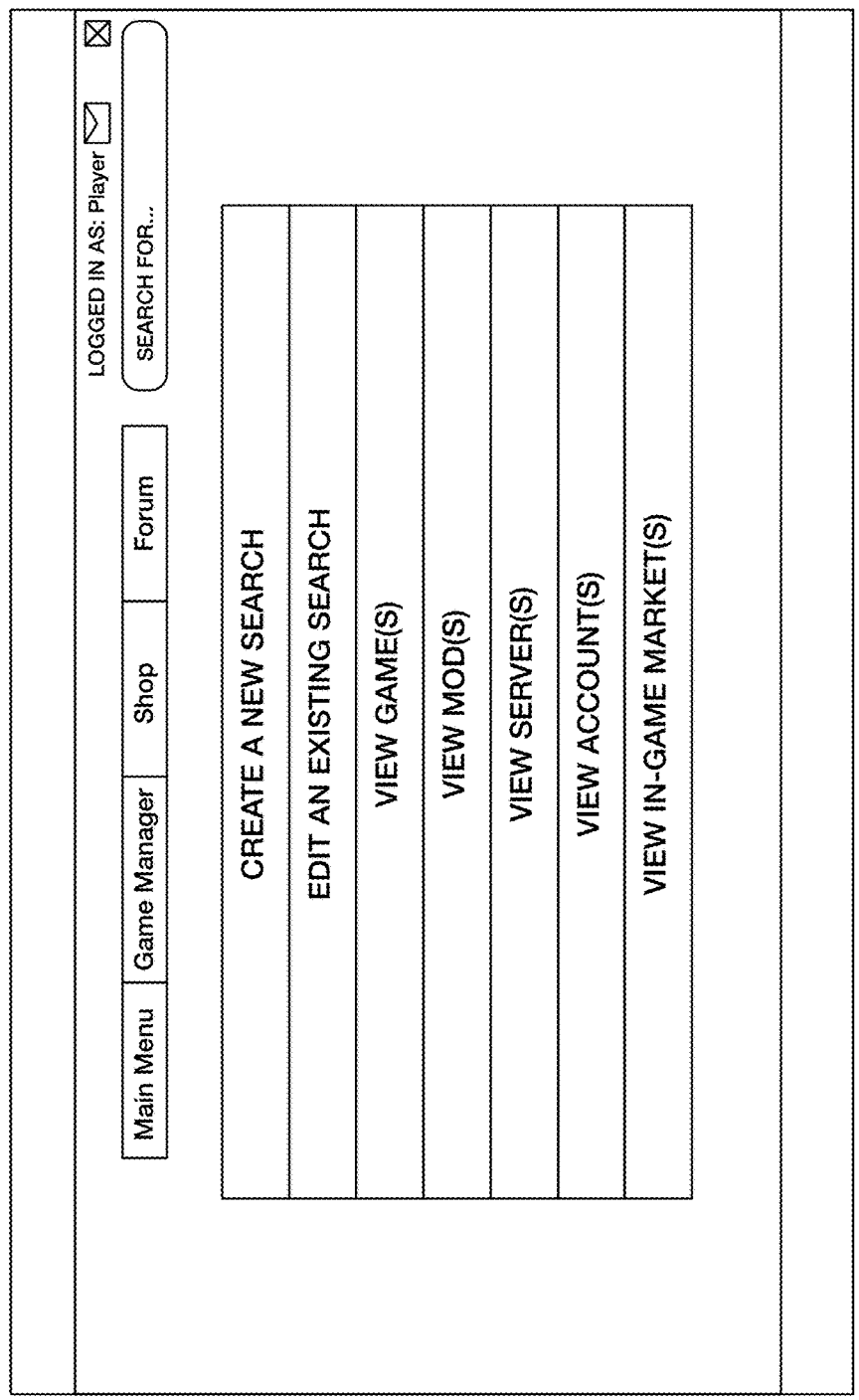
FIG. 13 shows an exemplary graphic user interface for an embodiment.

FIG. 13 show an example of a GUI for a "Main Menu" configured to access the GUIs described above.

Embodiments disclosed herein may be practiced using programmable digital computers configured to provide gaming experiences as described herein. An exemplary computer system includes at least one processor, such as an Intel Core™ or Xeon™ microprocessor or a Freescale™ PowerPC™ microprocessor, coupled to a communications channel. The computer system further can include an input device such as, e.g., a keyboard or mouse, a game controller an output device such as, e.g., a CRT or LCD display, a communications interface, a data storage device, such as a magnetic disk or an optical disk, and memory such as Random-Access Memory (RAM), each coupled to the communications channel. The communications interface may be coupled to a network such as the Internet.

One skilled in the art will recognize that data storage devices and memory can be parts of the same unit or units, and that the functions of one can be shared in whole or in part by the other, e.g., as RAM disks, virtual memory, etc. It will also be appreciated that any particular computer may have multiple components of a given type, e.g., processors, input devices, communications interfaces, etc.

The data storage device and/or memory may store an operating system such as Microsoft Windows®, Linux®, Mac OS®, or Unix®. Other programs may be stored instead of or in addition to the operating system. It will be appreciated that a computer system may also be implemented on platforms and operating systems other than those mentioned.

Any operating system or other program, or any part of either, may be written using one or more programming languages such as, e.g., Java®, C, C++, C#, Visual Basic®, VB.NET®, Perl, Ruby, Python, or other programming languages, possibly using object oriented design and/or coding techniques.

One skilled in the art will recognize that the computer system may also include additional components and/or systems, such as network connections, additional memory, additional processors, network interfaces, input/output busses, gaming controllers, for example. One skilled in the art will also recognize that the programs and data may be received by and stored in the system in alternative ways. For example, a computer-readable storage medium (CRSM) reader, such as, e.g., a magnetic disk drive, magneto-optical drive, optical disk drive, or flash drive, may be coupled to the communications bus for reading from a Computer-Readable Storage Medium (CRSM) such as, e.g., a magnetic disk, a magneto-optical disk, an optical disk, or flash RAM. Accordingly, the computer system may receive programs and/or data via the CRSM reader. Further, it will be appreciated that the term "memory" herein is intended to include various types of suitable data storage media, whether permanent or temporary, including among other things the data storage device, the memory, and the CRSM.

Computer systems may be connected in one or more networks, via, e.g., network interfaces. According to an embodiment, the network is, for example, any combination of linked computers, or processing devices, adapted to transfer and process data. The computer network may be private Internet Protocol (IP) networks, as well as public computer networks, such as the Internet that can utilize World Wide Web (www) browsing functionality. The term "the Internet" refers to the worldwide network of interconnected, packet-switched data networks that use the Internet Protocol (IP) to route and transfer data. A client and server on different networks may communicate via the Internet. For example, a workstation may request a World Wide Web file from a Web server. The Web server may process the request and pass it to, e.g., an application server. The application server may then conduct further processing, which may include, for example, sending data to and/or receiving data from one or more other data sources. Such a data source may include, e.g., other servers on the same network or a different one and/or a Database Management System ("DBMS").

An example of a wired network is a network that uses communication busses and MODEMS, or DSL lines, or a Local Area Network (LAN) or a Wide Area Network (WAN) to transmit and receive data between terminals. An example of a wireless network is a wireless LAN. A cellular network such as Global System for Mobile Communication (GSM) and Enhanced Data rates for GSM Evolution (EDGE) or LTE Advanced provide other examples of a wireless network. Also, IEEE 802.11 (Wi-Fi) is a commonly used wireless network in computer systems, which enables connection to the Internet or other machines that have Wi-Fi functionality. Wi-Fi networks broadcast radio waves that can be picked up by Wi-Fi receivers that are attached to different computers. Yet, other examples of a wireless network may include a 3G communication network, as well as a 4G or 5G communication network. Yet another example of a wireless network is Near Field Communication (NFC)—a set of short-range wireless technologies. NFC typically operates at a distance of 4 cm or less at rates ranging from 106 kbits to 848 kbit/s. NFC involves an initiator that generates an RF field, which in turn powers a passive target. The NFC target can take simple form factors such as tags, stickers, key fobs, or cards that do not require batteries, but can also be used in conjunction with smart cards or phones incorporating NFC functionality.

A network may, for example, connect one or more terminals or clients with each other and with other computer systems, such as file servers or mail servers. The connection may be achieved tangibly, e.g., via Ethernet® or optical cables, or wirelessly, e.g., through use of modulated microwave signals according to the IEEE 802.11 family of standards. A computer system that participates in the network may send data to another computer system in the network via the network connection.

One use of a network is to enable a computer system to provide services to other computer systems, consume services provided by other computer systems, or both. For example, a file server may provide common storage of files for one or more of the computers on a network. A computer sends data including a request for a file to the file server via the network and the file server may respond by sending the data from the file back to the requesting computer.

A network may be connected to one or more other networks, e.g., via a router. A router may also act as a firewall, monitoring and/or restricting the flow of data to and/or from a network as configured to protect the network. A firewall may alternatively be a separate device (not pictured) from the router.

Systems and modules described herein may comprise software, firmware, hardware, or any combination(s) of software, firmware, or hardware suitable for the purposes described herein. Software and other modules may reside on servers, workstations, personal computers, computerized tablets, PDAs, gaming devices, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Except to the extent necessary or inherent in the processes themselves, no particular order to steps or stages of methods or processes described in this disclosure, including the figures, is implied. In many cases the order of process steps may be varied, and various illustrative steps may be combined, altered, or omitted, without changing the purpose, effect or import of the methods described.

It will be appreciated from the above that the invention may be implemented as computer software, which may be supplied on a storage medium or via a transmission medium such as a local-area network or a wide-area network such as the Internet. It is to be further understood that, because some of the constituent system components and method steps depicted in the accompanying figures and otherwise herein can be implemented in software, the actual connections between the systems components (or the process steps) may differ depending upon the manner in which the present invention is programmed.

It is to be understood that the present invention can be implemented in various forms of hardware, software, firmware, special purpose processes, or a combination thereof. In one embodiment, the present invention can be implemented in software as an application program tangible embodied on a computer readable program storage device.

The application program can be uploaded to, and executed by, a machine comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims. It is therefore evident that the particular embodiments disclosed above may be altered or modified and all such variations are considered within the scope and spirit of the invention. Although illustrative embodiments of the invention have been described in detail herein, it is to be understood that the invention is not limited to those precise embodiments, and that various changes and modifications can be effected therein by one skilled in the art without departing from the scope and spirit of the invention.

While various discreet embodiments have been described throughout, the individual features of the various embodiments may be combined to form other embodiments not specifically described. The embodiments formed by combining the features of described embodiments are also within the scope of the disclosure.

What is claimed is:

1. A network-based game management system, comprising:
    a processor coupled to a network, the network including a plurality of game servers and a plurality of client devices including a user's client device;
    memory coupled to the processor;
    a game usage controller coupled to the processor and adapted to determine a user's rights of access to a plurality of games located at the plurality of game servers and at the user's client device, the plurality of games including multiple unrelated game titles produced by multiple unrelated game producers which are implemented across a plurality of device platforms;
    a game matching engine stored in the memory and operable on the processor to:
        find a desired gaming experience within the plurality of games, including single-player, multiplayer, and massively multiplayer online (MMO) game sessions, based on game metrics and user-selected parameters and conditionals, wherein the user-selected parameters include filters based on one or more of the device platforms, one or more maps, one or game modes, or one or more maps and one or more game modes; and
        provide user access to the desired gaming experience;
    a multiplayer gameplay supporter coupled to the processor and adapted to search for available players and game times related to the desired gaming experience;
    a game download module coupled to the processor and adapted to locally store game code relative to the desired gaming experience or to point to a location of the code;
    a network communication component coupled to the processor and adapted to return a prioritized list of potential gaming experiences at a user interface, based on the user-selected parameters and conditionals;
    a user account manager coupled to the processor and adapted to collect user account information from the plurality of client devices, to store this information in the memory or a user database, and to allow web-based user login to user accounts;
    a game metrics collector coupled to the processor and adapted to collect game metrics, including game versions, game scores, and user playing time, the game metrics stored in the memory or a game metrics database for analysis or reporting;
    an automatic placement engine stored in the memory and operable on the processor to automatically place the user's client device in a gaming experience that meets the user-selected parameters and conditionals; and
    an offline game generator adapted to generate an offline game experience using the user-selected parameters and conditionals that simulates an online game experience when a suitable online game experience is unavailable, non-existent, or delayed.

2. The game management system of claim 1, further comprising a client game generator configured to locally replace player objects from an online multiplayer game on a game server with downloaded game elements or artificial intelligence (AI) controlled objects when a connection with the game server is lost.

3. The game management system of claim 1, further comprising a versioning module coupled to the processor and adapted identify versions of games located at the user's client device and to determine whether new versions are available.

4. The game management system of claim 3, wherein the versioning module is adapted to communicate with the user's client device regarding new game product versions, including to communicate a location of downloadable game code or to automatically download game subcomponents to the user's client device.

5. The game management system of claim 1, wherein the user-selected conditionals include changing an order of the prioritized list of potential gaming experiences after a predetermined time has passed during a search for a desired gaming experience.

6. The game management system of claim 1, wherein the multiplayer gameplay supporter is adapted to provide multiplayer features across the plurality of device platforms, manage player turns in a multiplayer game session, support an exchange of in-game chat messages, maintain lobbies for different game products to allow game players to exchange information, and set up head-to-head games between users.

7. The game management system of claim 1, wherein the multiplayer gameplay supporter is adapted to rank game players based on losses, wins, and difficulty of multiplayer games, provide player rankings to users upon request, initiate or allow users to initiate tournaments, and define or allow users to define criteria for participation in tournaments.

8. A network-based game management system, comprising:
    a processor coupled to a network, the network including a plurality of game servers and a plurality of client devices including a user's client device;
    memory coupled to the processor;
    a game matching engine stored in the memory and operable on the processor to:
        find a desired gaming experience within a plurality of games located at the plurality of game servers and at the user's client device, based on game metrics and on one or more user-selected maps, one or more user-selected game modes, or one or more user-selected maps and one or more user-selected game modes, the plurality of games including multiple unrelated game titles produced by multiple unrelated game producers, including single-player, multiplayer, and massively multiplayer online (MMO) game sessions; and provide user access to the desired gaming experience;

a network communication component coupled to the processor and adapted to return a prioritized list of potential gaming experiences at a user interface, based on the user-selected parameters and conditionals;

an automatic placement engine stored in the memory and operable on the processor to automatically place the user's client device in a gaming experience that meets the user-selected parameters and conditionals; and a game generator adapted to locally generate a game experience using the user-selected parameters and conditionals to substitute for a desired game experience when a suitable online game experience is unavailable, non-existent, or delayed.

9. A network-based method, comprising:

determining a user's rights of access to a plurality of games located at a plurality of game servers and a user's client device, connected to a network, the plurality of games including multiple unrelated game titles produced by multiple unrelated game producers which are implemented across a plurality of device platforms;

finding a desired gaming experience within the plurality of games, including single-player, multiplayer, and massively multiplayer online (MMO) game sessions, based on game metrics and user-selected parameters and conditionals;

providing user access to the desired gaming experience;

searching for available players and game times related to the desired gaming experience;

locally storing game code relative to the desired gaming experience at the user's client device or pointing to a location of the game code;

returning a prioritized list of potential gaming experiences at a user interface or automatically placing the user's client device in a gaming experience, based on the user-selected parameters and conditionals; and filtering the prioritized list of potential gaming experiences based on one or more of the device platforms, one or more selected maps, one or more selected game modes, or one or more selected maps and one or more selected game modes; and creating an offline game with online-based content using the user-selected parameters and conditionals after a preset period of time without an online game experience, or if the desired gaming experience does not exist online.

10. The method of claim 9, further comprising generating a single-player game if a corresponding multiplayer game is not available after a specified period of time.

11. The method of claim 9, further comprising locally generating a seamless offline game experience at the user's client device in place of an online game experience when a server connection is lost or an online gaming experience is delayed, including substituting player objects from a multiplayer game on the server with artificial intelligence (AI) controlled objects.

12. The method of claim 11, further comprising generating an offline, single player game experience using the user-selected parameters and conditionals that simulates an online MMO game experience while waiting for a player opening at the online MMO game experience.

13. The method of claim 11, further comprising using stored user profile data to generate AI controlled substitution players within the offline game experience, to simulate actual online players, based on the experience levels or preferred playing styles of the actual online players.

14. The method of claim 9, further comprising creating, arranging, and prioritizing user-configurable search and filter parameters, sets of parameters, lists of sets of parameters, and conditionals based on user-input.

\* \* \* \* \*